(12) United States Patent
Moen et al.

(10) Patent No.: US 8,238,509 B2
(45) Date of Patent: Aug. 7, 2012

(54) NEUTRON MONITORING SYSTEMS INCLUDING GAMMA THERMOMETERS AND METHODS OF CALIBRATING NUCLEAR INSTRUMENTS USING GAMMA THERMOMETERS

(75) Inventors: Stephan Craig Moen, Wilmington, NC (US); Craig Glenn Meyers, Salem, VA (US); John Alexander Petzen, Roanoke, VA (US); Adam Muhling Foard, Christianburg, VA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 18 days.

(21) Appl. No.: 12/557,631

(22) Filed: Sep. 11, 2009

(65) Prior Publication Data
US 2011/0064181 A1 Mar. 17, 2011

(51) Int. Cl.
G21C 17/00 (2006.01)
(52) U.S. Cl. .......................... 376/254; 376/255; 376/245
(58) Field of Classification Search ................ 376/255, 376/254, 245
See application file for complete search history.

(56) References Cited

U.S. PATENT DOCUMENTS

| 4,614,635 | A |   | 9/1986 | Terhune |
| 5,015,434 | A |   | 5/1991 | Wimpee et al. |
| 5,116,567 | A |   | 5/1992 | Fennern |
| 5,204,053 | A |   | 4/1993 | Fennern |
| 5,251,242 | A | * | 10/1993 | Impink et al. ................. 376/254 |
| 6,310,929 | B1 |  | 10/2001 | Hirukawa |
| 6,408,041 | B2 |  | 6/2002 | Hirukawa |
| 2009/0135984 | A1 |  | 5/2009 | Fawks et al. |

* cited by examiner

Primary Examiner — Ricardo Palabrica
Assistant Examiner — Erin M Leach
(74) Attorney, Agent, or Firm — Harness, Dikey & Pierce, P.L.C.

(57) ABSTRACT

A method of calibrating a nuclear instrument using a gamma thermometer may include: measuring, in the instrument, local neutron flux; generating, from the instrument, a first signal proportional to the neutron flux; measuring, in the gamma thermometer, local gamma flux; generating, from the gamma thermometer, a second signal proportional to the gamma flux; compensating the second signal; and calibrating a gain of the instrument based on the compensated second signal. Compensating the second signal may include: calculating selected yield fractions for specific groups of delayed gamma sources; calculating time constants for the specific groups; calculating a third signal that corresponds to delayed local gamma flux based on the selected yield fractions and time constants; and calculating the compensated second signal by subtracting the third signal from the second signal. The specific groups may have decay time constants greater than $5\times10^{-1}$ seconds and less than $5\times10^5$ seconds.

19 Claims, 14 Drawing Sheets

FIG. 10

| Group Number | $\alpha_i$ (MeV/fission-second) for $^{235}U$ | $\lambda_i$ (seconds$^{-1}$) for $^{235}U$ | $\tau_i = 1/\lambda_i$ (seconds) for $^{235}U$ | $\alpha_i/\lambda_i$ (MeV/fission) for $^{235}U$ | Uncompensated Yield Fraction | Compensated Yield Fraction |
|---|---|---|---|---|---|---|
| 1 | $5.2800 \times 10^{-4}$ | $2.7216 \times 10^{0}$ | $3.6743 \times 10^{-1}$ | $1.9400 \times 10^{-4}$ | 0.00001 | 0.00000 |
| 2 | $6.8588 \times 10^{-1}$ | $1.0256 \times 10^{0}$ | $9.7504 \times 10^{-1}$ | $6.6876 \times 10^{-1}$ | 0.04970 | 0.01485 |
| 3 | $4.0752 \times 10^{-1}$ | $3.1419 \times 10^{-1}$ | $3.1828 \times 10^{0}$ | $1.2970 \times 10^{0}$ | 0.09639 | 0.02880 |
| 4 | $2.1937 \times 10^{-1}$ | $1.1788 \times 10^{-1}$ | $8.4832 \times 10^{0}$ | $1.8610 \times 10^{0}$ | 0.13830 | 0.04132 |
| 5 | $5.7701 \times 10^{-2}$ | $3.4365 \times 10^{-2}$ | $2.9099 \times 10^{1}$ | $1.6791 \times 10^{0}$ | 0.12478 | 0.03728 |
| 6 | $2.2530 \times 10^{-2}$ | $1.1762 \times 10^{-2}$ | $8.5020 \times 10^{1}$ | $1.9155 \times 10^{0}$ | 0.14235 | 0.04253 |
| 7 | $3.3392 \times 10^{-3}$ | $3.6065 \times 10^{-3}$ | $2.7728 \times 10^{2}$ | $9.2588 \times 10^{-1}$ | 0.06881 | 0.02056 |
| 8 | $9.3667 \times 10^{-4}$ | $1.3963 \times 10^{-3}$ | $7.1618 \times 10^{2}$ | $6.7082 \times 10^{-1}$ | 0.04985 | 0.01489 |
| 9 | $8.0899 \times 10^{-4}$ | $6.2608 \times 10^{-4}$ | $1.5972 \times 10^{3}$ | $1.2922 \times 10^{0}$ | 0.09603 | 0.02869 |
| 10 | $1.9572 \times 10^{-4}$ | $1.8924 \times 10^{-4}$ | $5.2843 \times 10^{3}$ | $1.0342 \times 10^{0}$ | 0.07686 | 0.02296 |
| 11 | $3.2609 \times 10^{-5}$ | $5.5074 \times 10^{-5}$ | $1.8157 \times 10^{4}$ | $5.9209 \times 10^{-1}$ | 0.04400 | 0.01315 |
| 12 | $7.5827 \times 10^{-6}$ | $2.0971 \times 10^{-5}$ | $4.7685 \times 10^{4}$ | $3.6158 \times 10^{-1}$ | 0.02687 | 0.00803 |
| 13 | $2.5189 \times 10^{-6}$ | $9.9940 \times 10^{-6}$ | $1.0006 \times 10^{5}$ | $2.5204 \times 10^{-1}$ | 0.01873 | 0.00560 |
| 14 | $4.9836 \times 10^{-7}$ | $2.5401 \times 10^{-6}$ | $3.9369 \times 10^{5}$ | $1.9620 \times 10^{-1}$ | 0.01458 | 0.00436 |
| 15 | $1.8523 \times 10^{-7}$ | $6.6332 \times 10^{-7}$ | $1.5076 \times 10^{6}$ | $2.7925 \times 10^{-1}$ | 0.02075 | 0.00620 |
| 16 | $2.6592 \times 10^{-8}$ | $1.2281 \times 10^{-7}$ | $8.1427 \times 10^{6}$ | $2.1653 \times 10^{-1}$ | 0.01609 | 0.00481 |
| 17 | $2.2356 \times 10^{-9}$ | $2.7163 \times 10^{-8}$ | $3.6815 \times 10^{7}$ | $8.2303 \times 10^{-2}$ | 0.00612 | 0.00183 |
| 18 | $8.9582 \times 10^{-12}$ | $3.2955 \times 10^{-9}$ | $3.0344 \times 10^{8}$ | $2.7183 \times 10^{-3}$ | 0.00020 | 0.00006 |
| 19 | $8.5968 \times 10^{-11}$ | $7.4225 \times 10^{-10}$ | $1.3473 \times 10^{9}$ | $1.1582 \times 10^{-1}$ | 0.00861 | 0.00257 |
| 20 | $2.1072 \times 10^{-14}$ | $2.4681 \times 10^{-10}$ | $4.0517 \times 10^{9}$ | $8.5377 \times 10^{-5}$ | 0.00001 | 0.00000 |
| 21 | $7.1219 \times 10^{-16}$ | $1.5596 \times 10^{-13}$ | $6.4119 \times 10^{12}$ | $4.5665 \times 10^{-3}$ | 0.00034 | 0.00010 |
| 22 | $8.1126 \times 10^{-17}$ | $2.2573 \times 10^{-14}$ | $4.4301 \times 10^{13}$ | $3.5939 \times 10^{-3}$ | 0.00027 | 0.00008 |
| 23 | $9.4678 \times 10^{-17}$ | $2.0503 \times 10^{-14}$ | $4.8773 \times 10^{13}$ | $4.6178 \times 10^{-3}$ | 0.00034 | 0.00010 |

FIG. 11

| Group Number | $\alpha_i$ (MeV/fission-second) for $^{235}$U | $\lambda_i$ (seconds$^{-1}$) for $^{235}$U | $\tau_i = 1/\lambda_i$ (seconds) for $^{235}$U | $\alpha_i/\lambda_i$ (MeV/fission) for $^{235}$U | Uncompensated Yield Fraction | Compensated Yield Fraction |
|---|---|---|---|---|---|---|
| 1 | $5.2800 \times 10^{-4}$ | $2.7216 \times 10^{0}$ | $3.6743 \times 10^{-1}$ | $1.9400 \times 10^{-4}$ | 0.00001 | 0.00000 |
| 2 | $6.8588 \times 10^{-1}$ | $1.0256 \times 10^{0}$ | $9.7504 \times 10^{-1}$ | $6.6876 \times 10^{-1}$ | 0.04970 | 0.01484 |
| 3 | $4.0752 \times 10^{-1}$ | $3.1419 \times 10^{-1}$ | $3.1828 \times 10^{0}$ | $1.2970 \times 10^{0}$ | 0.09639 | 0.02878 |
| 4 | $2.1937 \times 10^{-1}$ | $1.1788 \times 10^{-1}$ | $8.4832 \times 10^{0}$ | $1.8610 \times 10^{0}$ | 0.13830 | 0.04129 |
| 5 | $5.7701 \times 10^{-2}$ | $3.4365 \times 10^{-2}$ | $2.9099 \times 10^{1}$ | $1.6791 \times 10^{0}$ | 0.12478 | 0.03725 |
| 6 | $2.2530 \times 10^{-2}$ | $1.1762 \times 10^{-2}$ | $8.5020 \times 10^{1}$ | $1.9155 \times 10^{0}$ | 0.14235 | 0.04250 |
| 7 | $3.3392 \times 10^{-3}$ | $3.6065 \times 10^{-3}$ | $2.7728 \times 10^{2}$ | $9.2588 \times 10^{-1}$ | 0.06881 | 0.02054 |
| 8 | $9.3667 \times 10^{-4}$ | $1.3963 \times 10^{-3}$ | $7.1618 \times 10^{2}$ | $6.7082 \times 10^{-1}$ | 0.04985 | 0.01488 |
| 9 | $8.0899 \times 10^{-4}$ | $6.2608 \times 10^{-4}$ | $1.5972 \times 10^{3}$ | $1.2922 \times 10^{0}$ | 0.09603 | 0.02867 |
| 10 | $1.9572 \times 10^{-4}$ | $1.8924 \times 10^{-4}$ | $5.2843 \times 10^{3}$ | $1.0342 \times 10^{0}$ | 0.07686 | 0.02294 |
| 11 | $3.2609 \times 10^{-5}$ | $5.5074 \times 10^{-5}$ | $1.8157 \times 10^{4}$ | $5.9209 \times 10^{-1}$ | 0.04400 | 0.01314 |
| 12 | $7.5827 \times 10^{-6}$ | $2.0971 \times 10^{-5}$ | $4.7685 \times 10^{4}$ | $3.6158 \times 10^{-1}$ | 0.02687 | 0.00802 |
| 13 | $2.5189 \times 10^{-6}$ | $9.9940 \times 10^{-6}$ | $1.0006 \times 10^{5}$ | $2.5204 \times 10^{-1}$ | 0.01873 | 0.00559 |
| 14 | $4.9836 \times 10^{-7}$ | $2.5401 \times 10^{-6}$ | $3.9369 \times 10^{5}$ | $1.9620 \times 10^{-1}$ | 0.01458 | 0.00435 |
| 15 | $1.8523 \times 10^{-7}$ | $6.6332 \times 10^{-7}$ | $1.5076 \times 10^{6}$ | $2.7925 \times 10^{-1}$ | 0.02075 | 0.00620 |
| 16 | $2.6592 \times 10^{-8}$ | $1.2281 \times 10^{-7}$ | $8.1427 \times 10^{6}$ | $2.1653 \times 10^{-1}$ | 0.01609 | 0.00480 |
| 17 | $2.2356 \times 10^{-9}$ | $2.7163 \times 10^{-8}$ | $3.6815 \times 10^{7}$ | $8.2303 \times 10^{-2}$ | 0.00612 | 0.00183 |
| 18 | $8.9582 \times 10^{-12}$ | $3.2955 \times 10^{-9}$ | $3.0344 \times 10^{8}$ | $2.7183 \times 10^{-3}$ | 0.00020 | 0.00006 |
| 19 | $8.5968 \times 10^{-11}$ | $7.4225 \times 10^{-10}$ | $1.3473 \times 10^{9}$ | $1.1582 \times 10^{-1}$ | 0.00861 | 0.00257 |
| 20 | $2.1072 \times 10^{-14}$ | $2.4681 \times 10^{-10}$ | $4.0517 \times 10^{9}$ | $8.5377 \times 10^{-5}$ | 0.00001 | 0.00000 |
| 21 | $7.1219 \times 10^{-16}$ | $1.5596 \times 10^{-13}$ | $6.4119 \times 10^{12}$ | $4.5665 \times 10^{-3}$ | 0.00034 | 0.00010 |
| 22 | $8.1126 \times 10^{-17}$ | $2.2573 \times 10^{-14}$ | $4.4301 \times 10^{13}$ | $3.5939 \times 10^{-3}$ | 0.00027 | 0.00008 |
| 23 | $9.4678 \times 10^{-17}$ | $2.0503 \times 10^{-14}$ | $4.8773 \times 10^{13}$ | $4.6178 \times 10^{-3}$ | 0.00034 | 0.00010 |

FIG. 12

| Group Number | $\alpha_i$ (MeV/fission-second) for $^{239}$Pu | $\lambda_i$ (seconds$^{-1}$) for $^{239}$Pu | $\tau_i = 1/\lambda_i$ (seconds) for $^{239}$Pu | $\alpha_i / \lambda_i$ (MeV/fission) for $^{239}$Pu | Uncompensated Yield Fraction | Compensated Yield Fraction |
|---|---|---|---|---|---|---|
| 1  | $1.6540 \times 10^{-1}$  | $8.9246 \times 10^{0}$   | $1.1205 \times 10^{-1}$  | $1.8533 \times 10^{-2}$ | 0.00170 | 0.00048 |
| 2  | $3.6928 \times 10^{-1}$  | $6.9005 \times 10^{-1}$  | $1.4492 \times 10^{0}$   | $5.3515 \times 10^{-1}$ | 0.04898 | 0.01372 |
| 3  | $2.4006 \times 10^{-1}$  | $2.3618 \times 10^{-1}$  | $4.2341 \times 10^{0}$   | $1.0164 \times 10^{0}$  | 0.09304 | 0.02606 |
| 4  | $1.0269 \times 10^{-1}$  | $1.0118 \times 10^{-1}$  | $9.8834 \times 10^{0}$   | $1.0149 \times 10^{0}$  | 0.09290 | 0.02603 |
| 5  | $3.4916 \times 10^{-2}$  | $3.7193 \times 10^{-2}$  | $2.6887 \times 10^{1}$   | $9.3878 \times 10^{-1}$ | 0.08593 | 0.02407 |
| 6  | $2.2961 \times 10^{-2}$  | $1.4319 \times 10^{-2}$  | $6.9837 \times 10^{1}$   | $1.6035 \times 10^{0}$  | 0.14677 | 0.04112 |
| 7  | $3.9070 \times 10^{-3}$  | $4.5094 \times 10^{-3}$  | $2.2176 \times 10^{2}$   | $8.6641 \times 10^{-1}$ | 0.07930 | 0.02222 |
| 8  | $1.3080 \times 10^{-3}$  | $1.3211 \times 10^{-3}$  | $7.5694 \times 10^{2}$   | $9.9008 \times 10^{-1}$ | 0.09062 | 0.02539 |
| 9  | $7.0265 \times 10^{-4}$  | $5.3481 \times 10^{-4}$  | $1.8698 \times 10^{3}$   | $1.3138 \times 10^{0}$  | 0.12026 | 0.03369 |
| 10 | $1.4297 \times 10^{-4}$  | $1.7297 \times 10^{-4}$  | $5.7813 \times 10^{3}$   | $8.2656 \times 10^{-1}$ | 0.07566 | 0.02120 |
| 11 | $1.7642 \times 10^{-5}$  | $4.8918 \times 10^{-5}$  | $2.0442 \times 10^{4}$   | $3.6064 \times 10^{-1}$ | 0.03301 | 0.00925 |
| 12 | $7.3646 \times 10^{-6}$  | $2.1055 \times 10^{-5}$  | $4.7495 \times 10^{4}$   | $3.4978 \times 10^{-1}$ | 0.03202 | 0.00897 |
| 13 | $1.7720 \times 10^{-6}$  | $8.3687 \times 10^{-6}$  | $1.1949 \times 10^{5}$   | $2.1174 \times 10^{-1}$ | 0.01938 | 0.00543 |
| 14 | $5.4945 \times 10^{-7}$  | $2.3620 \times 10^{-6}$  | $4.2337 \times 10^{5}$   | $2.3262 \times 10^{-1}$ | 0.02129 | 0.00597 |
| 15 | $1.6736 \times 10^{-7}$  | $6.4594 \times 10^{-7}$  | $1.5481 \times 10^{6}$   | $2.5910 \times 10^{-1}$ | 0.02372 | 0.00664 |
| 16 | $2.1160 \times 10^{-8}$  | $1.2822 \times 10^{-7}$  | $7.7991 \times 10^{6}$   | $1.6503 \times 10^{-1}$ | 0.01511 | 0.00423 |
| 17 | $2.9388 \times 10^{-9}$  | $2.5166 \times 10^{-8}$  | $3.9736 \times 10^{7}$   | $1.1678 \times 10^{-1}$ | 0.01069 | 0.00299 |
| 18 | $1.3659 \times 10^{-10}$ | $1.3176 \times 10^{-8}$  | $7.5896 \times 10^{7}$   | $1.0367 \times 10^{-2}$ | 0.00095 | 0.00027 |
| 19 | $5.7450 \times 10^{-11}$ | $7.3568 \times 10^{-10}$ | $1.3593 \times 10^{9}$   | $7.8091 \times 10^{-2}$ | 0.00715 | 0.00200 |
| 20 | $3.8422 \times 10^{-14}$ | $2.4663 \times 10^{-10}$ | $4.0547 \times 10^{9}$   | $1.5579 \times 10^{-4}$ | 0.00001 | 0.00000 |
| 21 | $1.8030 \times 10^{-16}$ | $3.3490 \times 10^{-13}$ | $2.9860 \times 10^{12}$  | $5.3837 \times 10^{-4}$ | 0.00005 | 0.00001 |
| 22 | $1.8342 \times 10^{-15}$ | $1.8761 \times 10^{-13}$ | $5.3302 \times 10^{12}$  | $9.7767 \times 10^{-3}$ | 0.00089 | 0.00025 |
| 23 | $1.9884 \times 10^{-16}$ | $3.1544 \times 10^{-14}$ | $3.1702 \times 10^{13}$  | $6.3036 \times 10^{-3}$ | 0.00058 | 0.00016 |

FIG. 13

| Group Number | $\alpha_i$ (MeV/fission-second) for $^{238}$U | $\lambda_i$ (seconds$^{-1}$) for $^{238}$U | $\tau_i = 1/\lambda_i$ (seconds) for $^{238}$U | $\alpha_i/\lambda_i$ (MeV/fission) for $^{238}$U | Uncompensated Yield Fraction | Compensated Yield Fraction |
|---|---|---|---|---|---|---|
| 1  | $3.9368 \times 10^{-1}$  | $4.3427 \times 10^{0}$   | $2.3027 \times 10^{-1}$  | $9.0653 \times 10^{-2}$ | 0.00538 | 0.00225 |
| 2  | $7.4588 \times 10^{-1}$  | $1.7114 \times 10^{0}$   | $5.8432 \times 10^{-1}$  | $4.3583 \times 10^{-1}$ | 0.02584 | 0.01080 |
| 3  | $1.2169 \times 10^{0}$   | $6.0572 \times 10^{-1}$  | $1.6509 \times 10^{0}$   | $2.0090 \times 10^{0}$  | 0.11913 | 0.04980 |
| 4  | $5.2820 \times 10^{-1}$  | $1.9429 \times 10^{-1}$  | $5.1469 \times 10^{0}$   | $2.7186 \times 10^{0}$  | 0.16121 | 0.06739 |
| 5  | $1.4805 \times 10^{-1}$  | $6.9788 \times 10^{-2}$  | $1.4329 \times 10^{1}$   | $2.1214 \times 10^{0}$  | 0.12580 | 0.05259 |
| 6  | $4.5980 \times 10^{-2}$  | $1.8809 \times 10^{-2}$  | $5.3166 \times 10^{1}$   | $2.4446 \times 10^{0}$  | 0.14496 | 0.06060 |
| 7  | $1.0406 \times 10^{-2}$  | $6.1265 \times 10^{-3}$  | $1.6323 \times 10^{2}$   | $1.6985 \times 10^{0}$  | 0.10072 | 0.04210 |
| 8  | $1.6991 \times 10^{-3}$  | $1.3799 \times 10^{-3}$  | $7.2469 \times 10^{2}$   | $1.2313 \times 10^{0}$  | 0.07302 | 0.03052 |
| 9  | $6.9102 \times 10^{-4}$  | $5.2799 \times 10^{-4}$  | $1.8940 \times 10^{3}$   | $1.3088 \times 10^{0}$  | 0.07761 | 0.03244 |
| 10 | $1.4736 \times 10^{-4}$  | $1.6145 \times 10^{-4}$  | $6.1939 \times 10^{3}$   | $9.1273 \times 10^{-1}$ | 0.05412 | 0.02262 |
| 11 | $2.4049 \times 10^{-5}$  | $4.8419 \times 10^{-5}$  | $2.0653 \times 10^{4}$   | $4.9669 \times 10^{-1}$ | 0.02945 | 0.01231 |
| 12 | $6.9288 \times 10^{-6}$  | $1.5644 \times 10^{-5}$  | $6.3922 \times 10^{4}$   | $4.4290 \times 10^{-1}$ | 0.02626 | 0.01098 |
| 13 | $6.4927 \times 10^{-7}$  | $5.3610 \times 10^{-6}$  | $1.8653 \times 10^{5}$   | $1.2111 \times 10^{-1}$ | 0.00718 | 0.00300 |
| 14 | $4.3556 \times 10^{-7}$  | $2.1689 \times 10^{-6}$  | $4.6106 \times 10^{5}$   | $2.0082 \times 10^{-1}$ | 0.01191 | 0.00498 |
| 15 | $1.6020 \times 10^{-7}$  | $6.3343 \times 10^{-7}$  | $1.5787 \times 10^{6}$   | $2.5291 \times 10^{-1}$ | 0.01500 | 0.00627 |
| 16 | $2.3089 \times 10^{-8}$  | $1.2879 \times 10^{-7}$  | $7.7646 \times 10^{6}$   | $1.7928 \times 10^{-1}$ | 0.01063 | 0.00444 |
| 17 | $2.5481 \times 10^{-9}$  | $2.5604 \times 10^{-8}$  | $3.9056 \times 10^{7}$   | $9.9520 \times 10^{-2}$ | 0.00590 | 0.00247 |
| 18 | $3.5071 \times 10^{-11}$ | $9.1544 \times 10^{-9}$  | $1.0924 \times 10^{8}$   | $3.8311 \times 10^{-3}$ | 0.00023 | 0.00009 |
| 19 | $6.3399 \times 10^{-11}$ | $7.3940 \times 10^{-10}$ | $1.3524 \times 10^{9}$   | $8.5744 \times 10^{-2}$ | 0.00508 | 0.00213 |
| 20 | $4.1599 \times 10^{-14}$ | $2.4731 \times 10^{-10}$ | $4.0435 \times 10^{9}$   | $1.6821 \times 10^{-4}$ | 0.00001 | 0.00000 |
| 21 | $5.3295 \times 10^{-16}$ | $1.9594 \times 10^{-13}$ | $5.1036 \times 10^{12}$  | $2.7200 \times 10^{-3}$ | 0.00016 | 0.00007 |
| 22 | $1.6695 \times 10^{-18}$ | $6.4303 \times 10^{-14}$ | $1.5551 \times 10^{13}$  | $2.5963 \times 10^{-5}$ | 0.00000 | 0.00000 |
| 23 | $4.1058 \times 10^{-16}$ | $6.4229 \times 10^{-14}$ | $1.5569 \times 10^{13}$  | $6.3924 \times 10^{-3}$ | 0.00038 | 0.00016 |

FIG. 14

| Group Number | $\alpha_i$ (MeV/fission-second) for $^{241}$Pu | $\lambda_i$ (seconds$^{-1}$) for $^{241}$Pu | $\tau_i = 1/\lambda_i$ (seconds) for $^{241}$Pu | $\alpha_i/\lambda_i$ (MeV/fission) for $^{241}$Pu | Uncompensated Yield Fraction | Compensated Yield Fraction |
|---|---|---|---|---|---|---|
| 1  | 3.0934 × 10$^{-1}$  | 2.9049 × 10$^{0}$   | 3.4425 × 10$^{-1}$  | 1.0649 × 10$^{-1}$  | 0.00805 | 0.00253 |
| 2  | 5.4434 × 10$^{-1}$  | 6.4911 × 10$^{-1}$  | 1.5406 × 10$^{0}$   | 8.3859 × 10$^{-1}$  | 0.06338 | 0.01993 |
| 3  | 4.0782 × 10$^{-1}$  | 2.5569 × 10$^{-1}$  | 3.9110 × 10$^{0}$   | 1.5950 × 10$^{0}$   | 0.12055 | 0.03791 |
| 4  | 1.5828 × 10$^{-1}$  | 8.7123 × 10$^{-2}$  | 1.1478 × 10$^{1}$   | 1.8167 × 10$^{0}$   | 0.13731 | 0.04318 |
| 5  | 4.1577 × 10$^{-2}$  | 2.5068 × 10$^{-2}$  | 3.9891 × 10$^{1}$   | 1.6586 × 10$^{0}$   | 0.12536 | 0.03942 |
| 6  | 1.4818 × 10$^{-2}$  | 1.3323 × 10$^{-2}$  | 7.5058 × 10$^{1}$   | 1.1122 × 10$^{0}$   | 0.08406 | 0.02644 |
| 7  | 5.8176 × 10$^{-3}$  | 6.3772 × 10$^{-3}$  | 1.5681 × 10$^{2}$   | 9.1225 × 10$^{-1}$  | 0.06895 | 0.02168 |
| 8  | 1.9482 × 10$^{-3}$  | 2.0221 × 10$^{-3}$  | 4.9454 × 10$^{2}$   | 9.6345 × 10$^{-1}$  | 0.07282 | 0.02290 |
| 9  | 9.5196 × 10$^{-4}$  | 6.2933 × 10$^{-4}$  | 1.5890 × 10$^{3}$   | 1.5127 × 10$^{0}$   | 0.11433 | 0.03596 |
| 10 | 1.8208 × 10$^{-4}$  | 1.7462 × 10$^{-4}$  | 5.7267 × 10$^{3}$   | 1.0427 × 10$^{0}$   | 0.07881 | 0.02479 |
| 11 | 1.5310 × 10$^{-5}$  | 4.0172 × 10$^{-5}$  | 2.4893 × 10$^{4}$   | 3.8111 × 10$^{-1}$  | 0.02880 | 0.00906 |
| 12 | 4.5039 × 10$^{-6}$  | 1.5289 × 10$^{-5}$  | 6.5407 × 10$^{4}$   | 2.9458 × 10$^{-1}$  | 0.02227 | 0.00700 |
| 13 | 9.8277 × 10$^{-7}$  | 7.6113 × 10$^{-6}$  | 1.3138 × 10$^{5}$   | 1.2912 × 10$^{-1}$  | 0.00976 | 0.00307 |
| 14 | 5.1832 × 10$^{-7}$  | 2.5083 × 10$^{-6}$  | 3.9868 × 10$^{5}$   | 2.0664 × 10$^{-1}$  | 0.01562 | 0.00491 |
| 15 | 2.3018 × 10$^{-8}$  | 1.1312 × 10$^{-6}$  | 8.8402 × 10$^{5}$   | 2.0348 × 10$^{-2}$  | 0.00154 | 0.00048 |
| 16 | 1.5817 × 10$^{-7}$  | 6.2987 × 10$^{-7}$  | 1.5876 × 10$^{6}$   | 2.5112 × 10$^{-1}$  | 0.01898 | 0.00597 |
| 17 | 1.8074 × 10$^{-8}$  | 1.3149 × 10$^{-7}$  | 7.6051 × 10$^{6}$   | 1.3746 × 10$^{-1}$  | 0.01039 | 0.00327 |
| 18 | 3.6922 × 10$^{-9}$  | 2.4237 × 10$^{-8}$  | 4.1259 × 10$^{7}$   | 1.5234 × 10$^{-1}$  | 0.01151 | 0.00362 |
| 19 | 5.3843 × 10$^{-11}$ | 9.6433 × 10$^{-9}$  | 1.0370 × 10$^{8}$   | 5.5835 × 10$^{-3}$  | 0.00042 | 0.00013 |
| 20 | 5.3003 × 10$^{-11}$ | 7.3467 × 10$^{-10}$ | 1.3612 × 10$^{9}$   | 7.2145 × 10$^{-2}$  | 0.00545 | 0.00171 |
| 21 | 4.8358 × 10$^{-14}$ | 2.4827 × 10$^{-10}$ | 4.0279 × 10$^{9}$   | 1.9478 × 10$^{-4}$  | 0.00001 | 0.00000 |
| 22 | 9.8516 × 10$^{-16}$ | 1.6873 × 10$^{-13}$ | 5.9266 × 10$^{12}$  | 5.8387 × 10$^{-3}$  | 0.00044 | 0.00014 |
| 23 | 1.3076 × 10$^{-16}$ | 8.3639 × 10$^{-15}$ | 1.1956 × 10$^{14}$  | 1.5634 × 10$^{-2}$  | 0.00118 | 0.00037 |

NEUTRON MONITORING SYSTEMS INCLUDING GAMMA THERMOMETERS AND METHODS OF CALIBRATING NUCLEAR INSTRUMENTS USING GAMMA THERMOMETERS

GOVERNMENT SUPPORT

This invention was made with Government support under contract number DE-FC07-07ID14778, awarded by the U.S. Department of Energy. The United States Government has certain rights in the invention.

BACKGROUND

1. Field

Example embodiments relate to neutron monitoring systems including gamma thermometers and methods of calibrating nuclear instruments using gamma thermometers. Also, example embodiments relate to neutron monitoring systems including gamma thermometers in which nuclear instruments of the neutron monitoring systems are calibrated using compensated signals from the gamma thermometers. Additionally, example embodiments relate to methods of calibrating nuclear instruments using compensated signals from the gamma thermometers.

2. Description of Related Art

FIG. 1 is a sectional view, with parts cut away, of reactor pressure vessel ("RPV") 100 in a related art boiling water reactor ("BWR"). As known to a person having ordinary skill in the art ("PHOSITA"), during operation of the BWR, coolant water circulating inside RPV 100 is heated by nuclear fission produced in core 102. Feedwater is admitted into RPV 100 via feedwater inlet 104 and feedwater sparger 106 (a ring-shaped pipe that includes apertures for circumferentially distributing the feedwater inside RPV 100). The feedwater from feedwater sparger 106 flows down through downcomer annulus 108 (an annular region between RPV 100 and core shroud 110).

Core shroud 110 is a stainless steel cylinder that surrounds core 102. Core 102 includes a multiplicity of fuel bundle assemblies 112 (two 2×2 arrays, for example, are shown in FIG. 1). Each array of fuel bundle assemblies 112 is supported at or near its top by top guide 114 and at or near its bottom by core plate 116. Top guide 114 provides lateral support for the top of fuel bundle assemblies 112 and maintains correct fuel-channel spacing to permit control rod insertion.

The coolant water flows downward through downcomer annulus 108 and into core lower plenum 118. The coolant water in core lower plenum 118 in turn flows up through core 102. The coolant water enters fuel assemblies 112, wherein a boiling boundary layer is established. A mixture of water and steam exits core 102 and enters core upper plenum 120 under shroud head 122. Core upper plenum 120 provides standoff between the steam-water mixture exiting core 102 and entering standpipes 124. Standpipes 124 are disposed atop shroud head 122 and in fluid communication with core upper plenum 120.

The steam-water mixture flows through standpipes 124 and enters steam separators 126 (which may be, for example, of the axial-flow, centrifugal type). Steam separators 126 substantially separate the steam-water mixture into liquid water and steam. The separated liquid water mixes with feedwater in mixing plenum 128. This mixture then returns to core 102 via downcomer annulus 108. The separated steam passes through steam dryers 130 and enters steam dome 132. The dried steam is withdrawn from RPV 100 via steam outlet 134 for use in turbines and other equipment (not shown).

The BWR also includes a coolant recirculation system that provides the forced convection flow through core 102 necessary to attain the required power density. A portion of the water is sucked from the lower end of downcomer annulus 108 via recirculation water outlet 136 and forced by a centrifugal recirculation pump (not shown) into a plurality of jet pump assemblies 138 (only one of which is shown) via recirculation water inlets 140. Jet pump assemblies 138 are circumferentially distributed around core shroud 110 and provide the required reactor core flow.

As shown in FIG. 1, a related art jet pump assembly 138 includes a pair of inlet mixers 142. A related art BWR includes 16 to 24 inlet mixers 142. Each inlet mixer 142 has an elbow 144 welded to it that receives water from a recirculation pump (not shown) via inlet riser 146. An example inlet mixer 142 includes a set of five nozzles circumferentially distributed at equal angles about the axis of inlet mixer 142. Each nozzle is tapered radially inwardly at its outlet. Jet pump assembly 138 is energized by these convergent nozzles. Five secondary inlet openings are radially outside of the nozzle exits. Therefore, as jets of water exit the nozzles, water from downcomer annulus 108 is drawn into inlet mixer 142 via the secondary inlet openings, where it is mixed with coolant water from the recirculation pump. The coolant water then flows into jet pump assembly 138.

FIG. 2 is a top plan view of a related art core 200. As known to a PHOSITA, core 200 may include fuel bundles 202, peripheral fuel bundles 204, and/or control rods 206. Two or more of fuel bundles 202 may be included in fuel bundle assemblies 208. Core 200 may include, for example, hundreds or thousands of fuel bundles 202 and/or tens or hundreds of peripheral fuel bundles 204. As shown in FIG. 2, for example, core 200 may include approximately one thousand and twenty-eight (1,028) fuel bundles 202, approximately one hundred and four (104) peripheral fuel bundles 204, and/or approximately two hundred and sixty-nine (269) control rods 206.

The distribution of fuel bundles 202, peripheral fuel bundles 204, and/or control rods 206 in core 200 may or may not be symmetric. Additionally, if symmetry exists, it may include one or more of mirror-image symmetry, diagonal symmetry, rotational symmetry, translational symmetry, quadrant symmetry, and octant symmetry. As shown in FIG. 2, for example, one or more control rods 206 may be disposed in or near a geometric center of core 200.

Core 200 also may include one or more types of neutron monitors. These monitors may include, for example, one or more source range monitors, one or more intermediate range monitors, and/or one or more power range monitors. In a related art BWR, the one or more source range monitors may be fixed or movable. Similarly, in a related art BWR, the one or more intermediate range monitors may be fixed or movable.

At least some of the overall range of a related art source range monitor and/or a related art intermediate range monitor may be covered by a startup range neutron monitor ("SRNM") or wide range neutron monitor ("WRNM"). Similarly, at least some of the overall range of a related art intermediate range monitor and/or a related art power range monitor may be covered by a local power range monitor ("LPRM"). In a related art BWR, the SRNMs and/or the LPRMs may be fixed.

Core 200 may include, for example, tens of SRNM detectors and/or tens or hundreds of LPRM detectors. Although not shown in FIG. 2, core 200 may include, for example, approximately twelve (12) SRNM detectors. As shown in FIG. 2, for example, core 200 may include approximately two hundred and fifty-six (256) LPRM detectors in approximately sixty-four (64) LPRM assemblies 210. For example, one or more LPRM assemblies 210 may include four LPRM detectors (i.e., each LPRM assembly 210 may include four LPRM detectors).

FIG. 3 is a perspective view, partly broken away, showing a structure of a related art gamma thermometer ("GT") assembly 300. FIG. 4 is a view showing a principle for measuring a gamma ray heating value of GT assembly 300.

As known to a PHOSITA and as discussed, for example, in U.S. Pat. No. 6,310,929 B1 ("the '929 patent") and U.S. Pat. No. 6,408,041 B2 ("the '041 patent"), GT assembly 300 may include a thin and long rod-like assembly having a length substantially covering an effective fuel length of core 200 (e.g., between about 3 m and about 5 m in an axial direction of core 200. The equations and associated explanations of the '929 patent and the '041 patent are incorporated herein by reference.

As shown in FIG. 3, GT assembly 300 may include cover tube 302 and core tube 304. Annular space portions 306 may be formed between cover tube 302 and core tube 304. Each annular space portion 306 may form an adiabatic portion of GT assembly 300. For that purpose, annular space portions 306 may be filled with a gas having a low heat conductivity, such as argon (or another inert gas) or nitrogen. GT assembly 300 may include four or more annular space portions 306 (e.g., eight or nine). Annular space portions 306 may be discretely arranged at equal intervals in an axial direction of GT assembly 300.

Core tube 304 may have an internal hole 308 (see FIG. 4) that may extend through a center portion of core tube 304 along an axial direction of core tube 304. Cable sensor assembly 310 may be fixed inside internal hole 308. Cable sensor assembly 310 may include built-in heater 312, plurality of differential-type thermocouples 314, and cladding tube 316. Built-in heater 312 may function as an exothermic member of a heater wire for calibrating GT assembly 300. Differential-type thermocouples 314 may function as temperature sensors around built-in heater 312. Spaces within cladding tube 316 that are not occupied by built-in heater 312 or differential-type thermocouples 314 may be filled with electric insulating layer or metal/metal-alloy filler 318. Built-in heaters 312 may include cladding tubes 320, electric insulating layers 322, and/or heater wires 324. Differential-type thermocouples 314 may include cladding tubes 326, electric insulating layers 328, and/or thermocouple signal wires 330.

GT assembly 300 may include gamma ray heating detectors 332 (i.e., GT detectors 332). GT detectors 332 may be fixed at an axial position of GT assembly 300 near corresponding annular space portions 306. Each GT detector 332 may include high-temperature point 334 (also known as the insulated or hot junction) and low-temperature point 336 (also known as the uninsulated or cold junction) of differential-type thermocouple 314. High-temperature point 334 may be near corresponding annular space portion 306. Low-temperature point 336 may be below or above corresponding annular space portion 306.

During steady-state operation, gamma ray flux may be proportional to thermal neutron flux. The gamma ray flux may deposit energy in the form of heat in structural elements of GT assembly 300, such as core tube 304. The deposited heat energy may be proportional to the gamma ray flux. Because the removal of heat energy from GT detector 332 in a vicinity of annular space portions 306 is relatively low while the removal of heat energy from GT detectors 332 not in a vicinity of annular space portions 306 is relatively high, a temperature difference may develop between high-temperature point 334 and low-temperature point 336 of differential-type thermocouple 314. This temperature difference may be detected as a voltage difference in differential-type thermocouple 314, may be proportional to the gamma ray flux and, thus, may be proportional to thermal neutron flux. Therefore, during steady-state operation, GT assembly 300 effectively may measure thermal neutron flux.

Characteristic values for GT detector 332 may include sensitivity $S_0$ (in millivolts per watt per gram or mV/(W/g)) and/or alpha factor $\alpha$ (in 1/mV or mV$^{-1}$).

Although typically written as $S_0$, sensitivity $S_0$ may be understood to be time-dependent and, thus, may be written as $S_0(t)$. Alpha factor $\alpha$ may represent a temperature dependence related to physical properties of the structural material of GT detector 332. Alpha factor $\alpha$ may be considered to have a constant value.

Due to exposure in the high neutron and/or gamma flux environment of core 200, sensitivity $S_0(t)$ generally may decrease over time. This decrease may be expressed using Equation (1) below, where $S_0(0)=a+b$.

$$S_0(t)=a+b*\exp(-\lambda*t) \quad (1)$$

As known to a PHOSITA, values for a, b, and $\lambda$ may be predicted based on previous data and/or experience. As also known to a PHOSITA, values for a, b, and $\lambda$ may be calculated and/or verified based on data recorded during GT calibrations.

As discussed above, when calibrating GT assembly 300, built-in heater 312 may function as an exothermic member, providing additional heating $P_H$ (in W/g). A relationship between sensitivity $S_0(t)$, alpha factor $\alpha$, unheated output voltage U (in mV) of GT detector 332, heated output voltage U' (in mV) of GT detector 332, and additional heating $P_H$ of GT detector 332 may be expressed using Equation (2) below.

$$S_0(t)=\{[U'/(1+\alpha*U')]-[U/(1+\alpha*U)]\}/P_H \quad (2)$$

When not calibrating GT assembly 300, a relationship between sensitivity $S_0(t)$, alpha factor $\alpha$, output voltage $U_\gamma$ (in mV) of GT detector 332, and gamma ray heating value $W_\gamma$ (in W/g) of GT detector 332 may be expressed using Equation (3) below.

$$U_\gamma=S_0(t)*(1+\alpha*U_\gamma)*W_\gamma \quad (3)$$

Rearranging Equation (3) above may allow the calculation of gamma ray heating value $W_\gamma$ using Equation (4) below.

$$W_\gamma=U_\gamma/[S_0(t)*(1+\alpha*U_\gamma)] \quad (4)$$

FIG. 5 is a perspective view, partly broken away, showing an arrangement relationship of detectors of an in-core fixed nuclear instrumentation system of a related art power distribution monitoring system. FIG. 6 is a front view, partly broken away, showing the arrangement relationship of the detectors in FIG. 5.

As known to a PHOSITA, core 500 may include a large number of groups of four fuel assemblies 502. An in-core nuclear instrumentation system may include a plurality of in-core nuclear instrumentation assemblies 504. In-core nuclear instrumentation assemblies 504 may be disposed at corner water gap 506, surrounded by a group of four fuel assemblies 502. In-core nuclear instrumentation assemblies 504 may be disposed at different positions in core 500 from control rods 508.

In-core nuclear instrumentation assemblies 504 may include a thin and long nuclear instrumentation tube 510, LPRM detector assembly 512, and GT detector assembly 514.

LPRM detector assembly 512, housed in nuclear instrumentation tube 510, may function as a fixed neutron detection means. LPRM detector assembly 512 may include a plurality (e.g., four) of LPRM detectors 516. LPRM detectors 516 may be discretely arranged in an axial direction of core 500, at equal intervals L in nuclear instrumentation tube 510. LPRM detectors 516 may substantially cover an effective fuel length H (see FIG. 6) of core 500. Each LPRM detector 516 may be configured to measure neutron flux so as to generate a neutron flux signal (LPRM signal) according to the measured neutron flux. And each LPRM detector 516 may be electrically connected to an LPRM signal processing unit (not shown).

GT detector assembly 514, also housed in nuclear instrumentation tube 510, may function as a fixed gamma ray detection means. GT detector assembly 514 may include a plurality (e.g., eight) of GT detectors 332.

GT detectors 332 may be discretely arranged in an axial direction of core 500 in nuclear instrumentation tube 510. GT detectors 332 may substantially cover the effective fuel length H of core 500. Each GT detector 332 may be configured to measure gamma ray flux so as to generate a gamma ray flux signal (GT signal) according to the measured gamma ray flux. And each GT detector 332 may be electrically connected to a GT signal processing unit (not shown).

A large number of fuel rods (not shown) may be housed in channel box 518. Channel box 518 may be, for example, rectangular or cylindrical.

FIG. 7 is a block diagram showing schematically a structure of a reactor power distribution monitoring system of a BWR.

As known to a PHOSITA, reactor power distribution monitoring system 700 of a BWR may include an in-core fixed nuclear instrumentation system 702. In-core fixed nuclear instrumentation system 702 may have detectors, signal processing units, and process control computer 704 for monitoring an operating mode of the BWR and/or core performance.

Process control computer 704 may include, for example, central processing unit ("CPU") 706, memory unit 708, input console 710, and/or display unit 712. CPU 706 may be electrically connected to memory unit 708, input console 710, and display unit 712 so as to enable communication between them.

Process control computer 704 may include a function for simulating a core power distribution of the BWR and/or a function for monitoring a core performance of the BWR according to the simulated core power distribution.

As shown in FIG. 7, core 500 may be housed in reactor pressure vessel 714. Reactor pressure vessel 714 may be housed in primary containment 716.

As discussed above, each LPRM detector 516 may be configured to measure neutron flux so as to generate a neutron flux signal (LPRM signal) according to the measured neutron flux. And each LPRM detector 516 may be electrically connected to LPRM signal processing unit 718 using signal cables 720 through penetration portion 722, forming power range neutron flux measuring system 724. LPRM signal processing unit 718 may include a computer having a CPU, a memory unit, and so on.

As known to a PHOSITA, LPRM signal processing unit 718 may be operative to perform, for example, analog-to-digital ("A/D") conversion operations and/or gain processing operations of each LPRM signal S2 transmitted from each LPRM detector 516 so as to obtain digital LPRM data D2, and then to transmit digital LPRM data D2 to process control computer 704.

As discussed above, GT detector assembly 514 may be configured so that a plurality of GT detectors 332 may be discretely arranged in the axial direction of core 500. A gamma ray heating value may be measured by each GT detector 332. The number of GT detectors 332 should be the same as or more than the number of LPRM detectors 516. Each GT detector 332 may be electrically connected to GT signal processing unit 726 using signal cable 728 through penetration portion 730, forming GT power distribution measuring system 732.

As known to a PHOSITA, GT signal processing unit 726 may be configured to obtain digital GT data D1 using GT signals S1 outputted from GT detectors 332, as well as sensitivity $S_O$ and alpha factor $\alpha$ of the respective GT detector 332. Digital GT data D1 may represent a gamma ray heating value in watts per gram of unit weight (W/g). GT signal processing unit 726 may be operative to transmit digital GT data D1 to process control computer 704.

In-core fixed nuclear instrumentation system 702 may include gamma ray thermometer heater control unit 734. Gamma ray thermometer heater control unit 734 may be electrically connected to each built-in heater 312 using power cables 746.

Core state data measuring device 736 may be provided in reactor pressure vessel 714 and/or primary system piping (not shown). Core state data measuring device 736 may provide core state data signal S3. Core state data signal S3 may include, for example, control rod pattern, core coolant flow rate, internal pressure of reactor pressure vessel 714, feed water flow rate, feed water temperature (e.g., core inlet coolant temperature), and so on. Core state data signal S3 may be used as various operating parameters indicative of a reactor operating mode (state) of the BWR.

A first part of core state data measuring device 736, inside reactor pressure vessel 714, may be connected to core state data processing unit 738 using signal cable 740 through penetration portion 742. A second part of core state data measuring device 736, outside reactor pressure vessel 714, may be connected using signal cable 740 to core state data processing unit 738. The first and/or second parts of core state data measuring device 736 may form process data measuring system 744.

As known to a PHOSITA, core state data processing unit 738 may be configured to obtain digital core state data D3 using core state data signal S3. Core state data processing unit 738 may be operative to transmit digital core state data D3 to process control computer 704.

CPU 706 may include nuclear instrumentation control process module 748 and/or power distribution simulation process module 750. Nuclear instrumentation control process module 748 may monitor and/or control in-core fixed nuclear instrumentation system 702.

As known to a PHOSITA, power distribution simulation process module 750 may correct the power distribution simulation result of nuclear instrumentation control process module 748, using digital GT data D1, digital LPRM data D2, and/or digital core state data D3, in order to obtain a core power distribution reflecting the actually measured data in core 500.

Memory unit 708 may include nuclear instrumentation control program module PM1, power distribution simulation program module PM2, and/or power distribution learning (adaptive) program module PM3. Power distribution simulation program module PM2 may include a physics model, such as a three-dimensional thermal-hydraulic simulation code.

Power distribution simulation process module 750 may simulate neutron flux distribution in core 500, may simulate power distribution in core 500, and/or may simulate margins with respect to one or more operational thermal limits (e.g., maximum linear heat generation rate ("MLHGR") and/or minimum critical power ratio ("MCPR")) using power distribution simulation program module PM2. Power distribution simulation process module 750 may be operative to correct the simulation results in order to obtain a core power distribution reflecting the actually measured core nuclear instrumentation data on the basis of power distribution learning (adaptive) program module PM3.

As discussed above, power distribution simulation process module 750 may correct the simulated results (neutron flux distribution and/or power distribution in core 500) stored in memory unit 708—according to inputted digital GT data D1, digital LPRM data D2, and/or digital core state data D3—in order to determine an accurate core power distribution and/or an accurate margin with respect to the one or more operational thermal limits, which reflect the actual core nuclear instrumentation data (digital GT data D1, digital LPRM data D2, and/or digital core state data D3).

As known to a PHOSITA, LPRM detectors generally may include a cathode having fissionable material coated on the cathode. The fissionable material may be a mixture of $U^{234}$ and $U^{235}$. The $U^{235}$ may be used to provide a signal proportional to the thermal neutron flux. But due to the extremely high thermal neutron flux in the nuclear reactor core, the $U^{235}$ may be subject to burnout, which may cause the LPRM detector reading corresponding to a constant thermal neutron flux to gradually decrease over time. The $U^{234}$ may absorb thermal neutrons to become $U^{235}$, lengthening the life of the LPRM detector. Eventually, however, the LPRM detector reading corresponding to a constant thermal neutron flux may still gradually decrease over time.

As also known to a PHOSITA, a gamma thermometer may provide a capability to calibrate an associated LPRM detector. During steady-state operation, gamma flux may be proportional to thermal neutron flux. Thus, a gamma thermometer—located near the associated LPRM detector—may measure local gamma flux during a steady-state heat balance, as known to a PHOSITA. The local gamma flux may be related to the proportional thermal neutron flux and the associated LPRM detector may be calibrated based on the related proportional thermal neutron flux.

Various solutions to the problem of calibrating nuclear instruments in nuclear reactors—using gamma thermometers—have been proposed, as discussed, for example, in U.S. Pat. No. 4,614,635 ("the '635 patent"), U.S. Pat. No. 5,015,434 ("the '434 patent"), U.S. Pat. No. 5,116,567 ("the '567 patent"), and U.S. Pat. No. 5,204,053 ("the '053 patent"), as well as U.S. Patent Publication No. 2009/0135984 A1 ("the '984 publication"). The disclosures of the '635 patent, the '434 patent, the '567 patent, the '053 patent, and the '984 publication are incorporated in the present application by reference. However, these various solutions do not include calibrating nuclear instruments in nuclear reactors—using gamma thermometers—wherein the calibrating of the nuclear instruments may be performed simply, automatically, in real-time, and/or with reduced cost when the associated nuclear reactor is not in steady-state operation.

FIG. 8 is a block diagram of a related art GT signal processor 800 of a BWR.

As known to a PHOSITA and as discussed, for example, in Japanese Laid-Open Patent Publication No. 2001-083280 ("JP '280")—and its associated machine translation—GT signal processor 800 of a BWR may include GT signal site board 802, GT control panel 804, and/or a communication circuit (via transmitter 834 and optical cable 836) between GT signal site board 802 and GT control panel 804. The equations and associated explanations of JP '280 and its associated machine translation are incorporated herein by reference.

GT signal site board 802 may include amplifiers 806, low-pass filters 808, multiplexer 810, A/D converter 812, signal holding circuit 814, digital signal processor ("DSP") 816, memory 818, and/or input/output ("I/O") buffer 820. Delayed gamma compensation module 822 may include signal holding circuit 814, digital signal processor ("DSP") 816, and/or memory 818.

GT control panel 804 may include transmitter 824, CPU 826, I/O buffer 828, memory 830, and/or display console 832.

FIG. 8 also depicts transmitter 834, optical cable 836, GT heater control panel 838, I/O machine 840, heater wires 842, additional GT signal site board or boards 844, and/or differential thermocouples 846.

Delayed gamma compensation module 822 of GT signal processor 800 may disclose calibrating nuclear instruments in nuclear reactors—using gamma thermometers—wherein the calibrating of the nuclear instruments may be performed when the associated nuclear reactor is not in steady-state operation.

Delayed gamma compensation module 822 may define a total GT signal R(t) (in mV) to include a prompt component $[a_0*P(t)]$ (in mV) and a delayed component $[\Sigma a_m*u_m(t)]$, where in the summation $\Sigma$, m=1, 2, ..., M] (in mV), as shown in Equation (5) below.

$$R(t)=a_0*P(t)+\Sigma(a_m*u_m(t)) \quad (5)$$

In Equation (5), $a_0$ may represent a constant term, P(t) may represent an instant response term, $a_m$ may represent constant terms, and $u_m(t)$ may represent a delayed response term, defined by Equation (6) below.

$$u_m(t)=1/\tau_m*\int P(t')*\exp[-(t-t')/\tau_m]dt' \quad (6)$$

The integration in Equation (6) may be performed from t=$-\infty$ to t, and $\tau_m$ may be a thermal time constant.

Rearranging Equation (5) above may allow the calculation of instant response term P(t) using Equation (7) below.

$$P(t)=[R(t)-\Sigma(a_m*u_m(t))]/a_0 \quad (7)$$

As known to a PHOSITA, instant response term P(t) for a given GT detector 332 may be converted to digital GT data D1 and then compared to digital LPRM data D2 for the purpose of calibrating a corresponding LPRM detector 516.

SUMMARY

Example embodiments may relate to neutron monitoring systems including gamma thermometers and methods of calibrating nuclear instruments using gamma thermometers. Also, example embodiments may relate to neutron monitoring systems including gamma thermometers in which nuclear instruments of the neutron monitoring systems are calibrated using compensated signals from the gamma thermometers. Additionally, example embodiments may relate to methods of calibrating nuclear instruments using compensated signals from the gamma thermometers.

In example embodiments, a method of calibrating a nuclear instrument using a gamma thermometer may include: measuring, in the nuclear instrument, local neutron flux; generating, from the nuclear instrument, a first signal proportional to the measured local neutron flux; measuring, in the gamma thermometer, local gamma flux; generating, from the gamma thermometer, a second signal proportional to the measured local gamma flux; compensating the second signal; and/or calibrating a gain of the nuclear instrument based on the compensated second signal. Compensating the second signal may include: calculating selected yield fractions for specific groups of delayed gamma sources; calculating time constants for the specific groups of delayed gamma sources; calculating a third signal that corresponds to delayed local gamma flux based on the selected yield fractions and time constants; and/or calculating the compensated second signal by subtracting the third signal from the second signal. The specific groups of delayed gamma sources may have decay time constants greater than $5\times10^{-1}$ seconds and less than $5\times10^{5}$ seconds.

In example embodiments, a method of using a gamma thermometer may include: measuring, in the gamma thermometer, local gamma flux; generating, from the gamma thermometer, a first signal proportional to the measured local gamma flux; compensating the first signal; and/or calibrating a gain of a nuclear instrument based on the compensated first signal. Compensating the first signal may include: calculating selected yield fractions for specific groups of delayed gamma sources; calculating time constants for the specific groups of delayed gamma sources; calculating a second signal that corresponds to delayed local gamma flux based on the selected yield fractions and time constants; and/or calculating the compensated first signal by subtracting the second signal from the first signal. The specific groups of delayed gamma sources may have decay time constants greater than $5\times10^{-1}$ seconds and less than $5\times10^{5}$ seconds.

In example embodiments, a neutron monitoring system may include: a plurality of nuclear instruments; a plurality of gamma thermometers; a processor; and/or a memory. Each gamma thermometer may be associated with one of the nuclear instruments. Each nuclear instrument may measure local neutron flux and/or may generate a first signal proportional to the measured local neutron flux. Each gamma thermometer may measure local gamma flux and/or may generate a second signal proportional to the measured local gamma flux. Selected yield fractions for specific groups of delayed gamma sources may be calculated by the processor, stored in the memory, or calculated by the processor and stored in the memory. Time constants for the specific groups of delayed gamma sources may be calculated by the processor, stored in the memory, or calculated by the processor and stored in the memory. The processor may calculate, for each gamma thermometer, a third signal that corresponds to delayed local gamma flux based on the selected yield fractions and/or time constants. The processor may calculate a compensated second signal, for each gamma thermometer, by subtracting the third signal from the second signal. A gain of each nuclear instrument may be calibrated based on the compensated second signal for the associated gamma thermometer. The specific groups of delayed gamma sources may have decay time constants greater than $5\times10^{-1}$ seconds and less than $5\times10^{5}$ seconds.

BRIEF DESCRIPTION OF THE DRAWINGS

The above and/or other aspects and advantages will become more apparent and more readily appreciated from the following detailed description of example embodiments taken in conjunction with the accompanying drawings, in which:

FIG. 10 is a table based on Table 9 of an American Nuclear Society ("ANS") standard;

FIG. 11 also is a table based on Table 9 of the ANS standard;

FIG. 12 is a table based on Table 10 of the ANS standard;

FIG. 13 is a table based on Table 11 of the ANS standard; and

FIG. 14 is a table based on Table 12 of the ANS standard.

DETAILED DESCRIPTION OF EXAMPLE EMBODIMENTS

Figure 1:
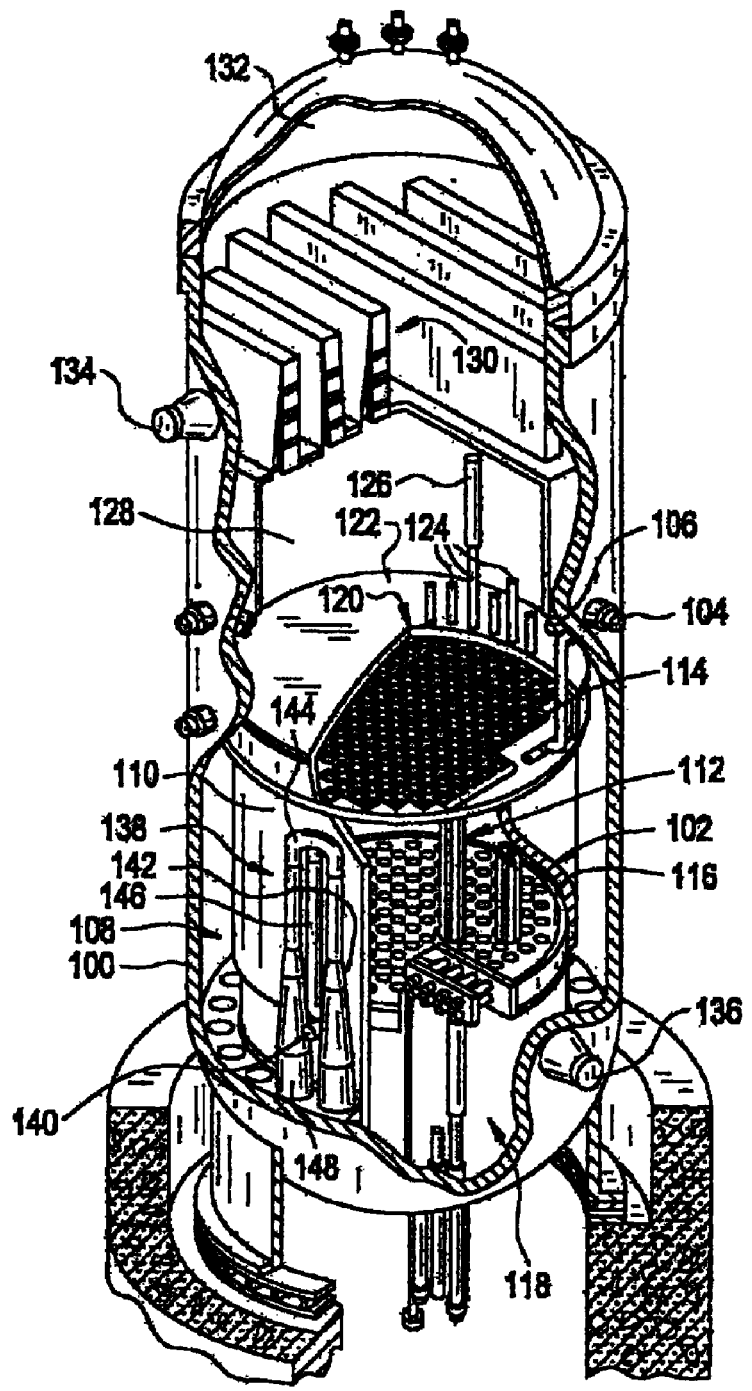
FIG. 1 is a sectional view, with parts cut away, of an RPV in a related art BWR.
Figure 2:
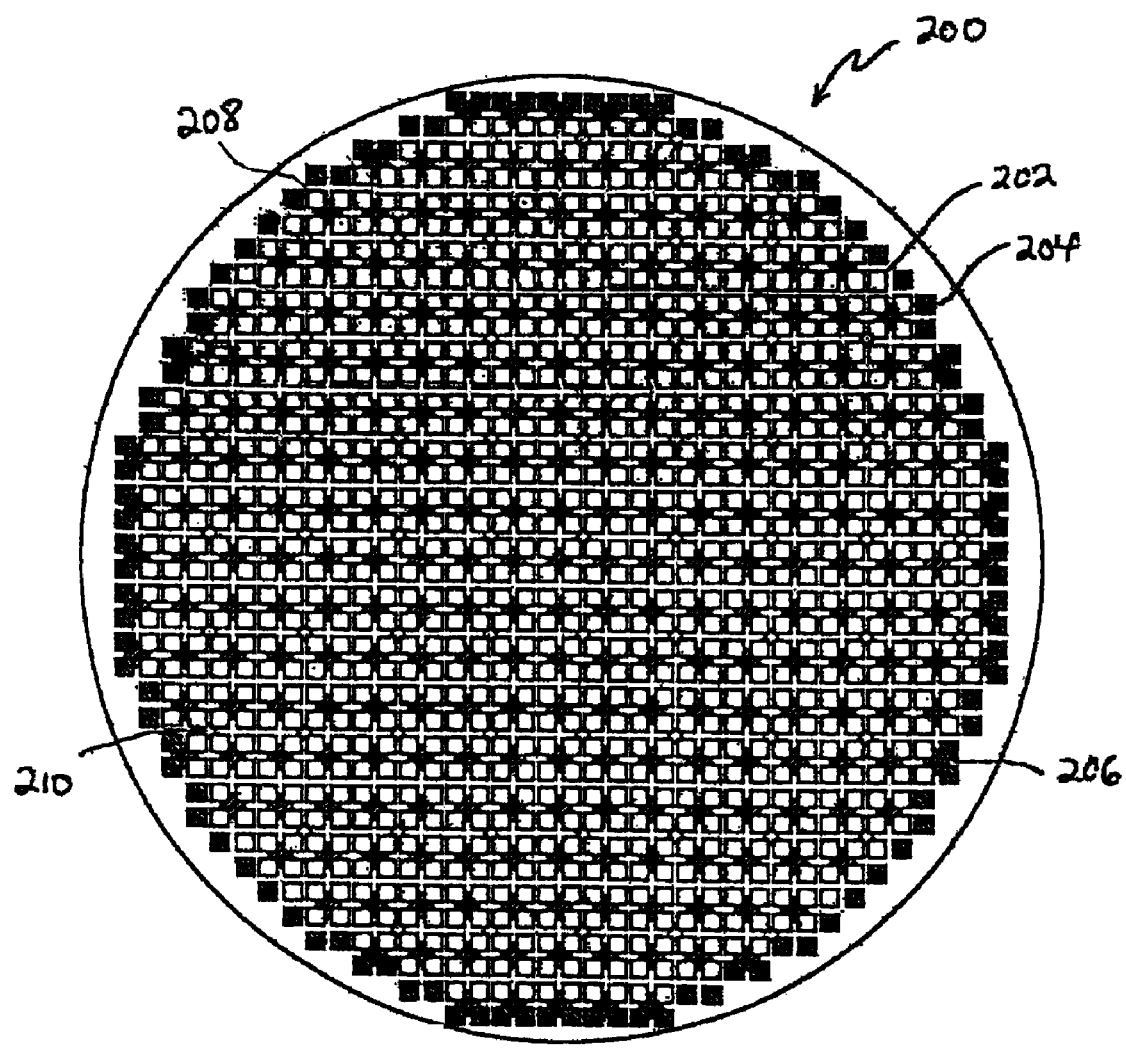
FIG. 2 is a top plan view of a related art nuclear reactor core.
Figure 3:
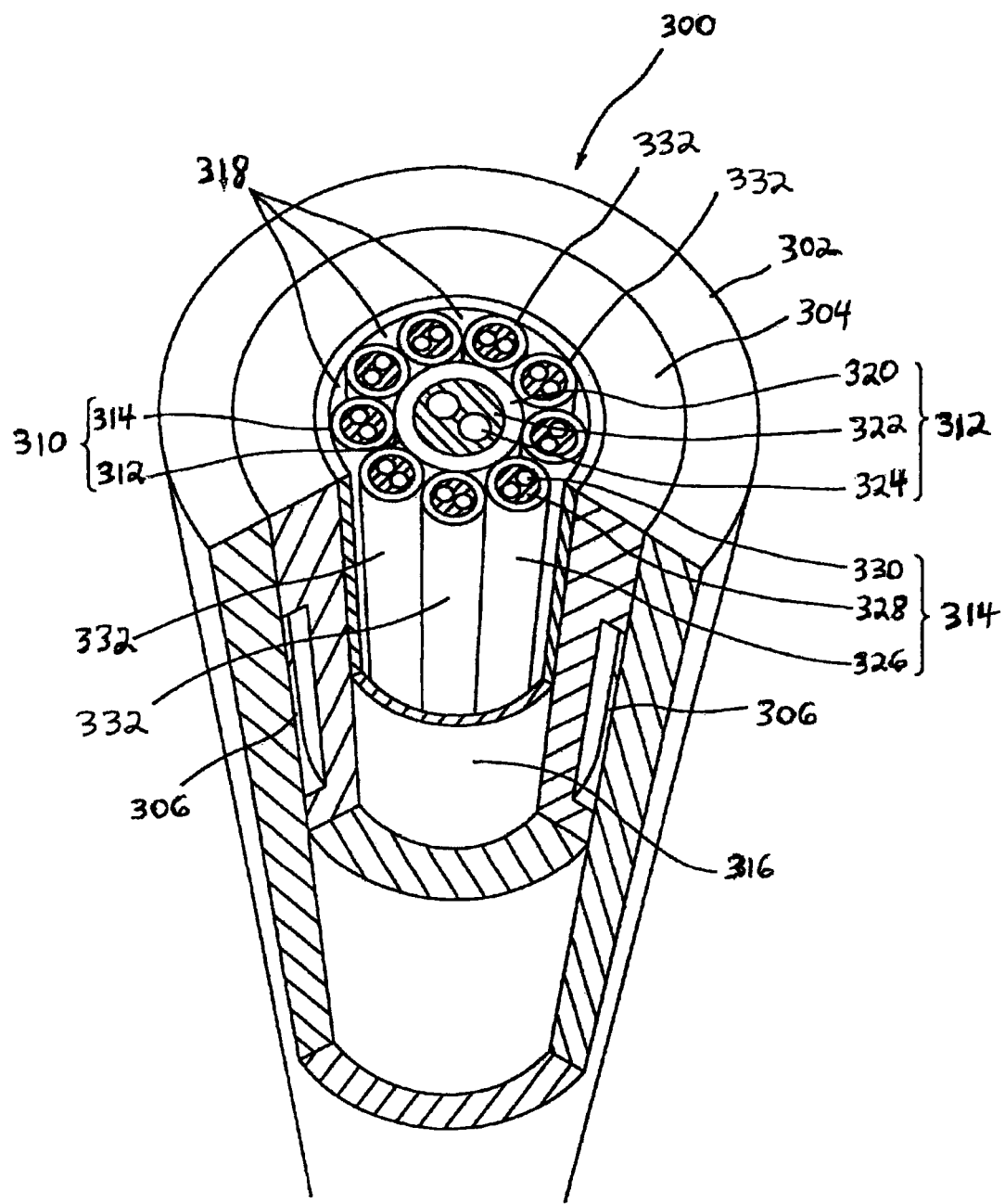
FIG. 3 is a perspective view, partly broken away, showing a structure of a related art gamma ray thermometer assembly.
Figure 4:
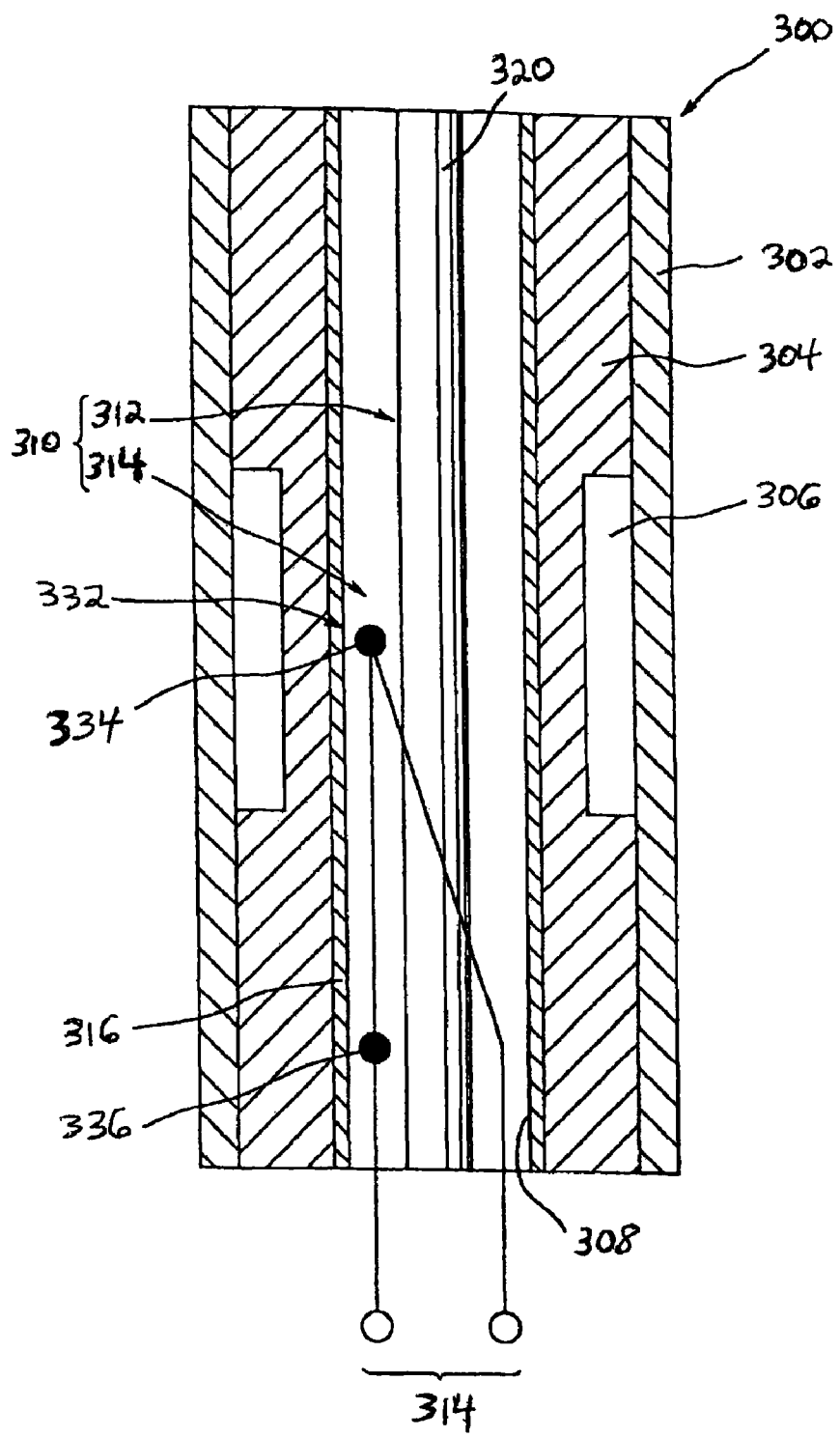
FIG. 4 is a view showing a principle for measuring a gamma ray heating value of a related art gamma ray thermometer assembly.
Figure 5:
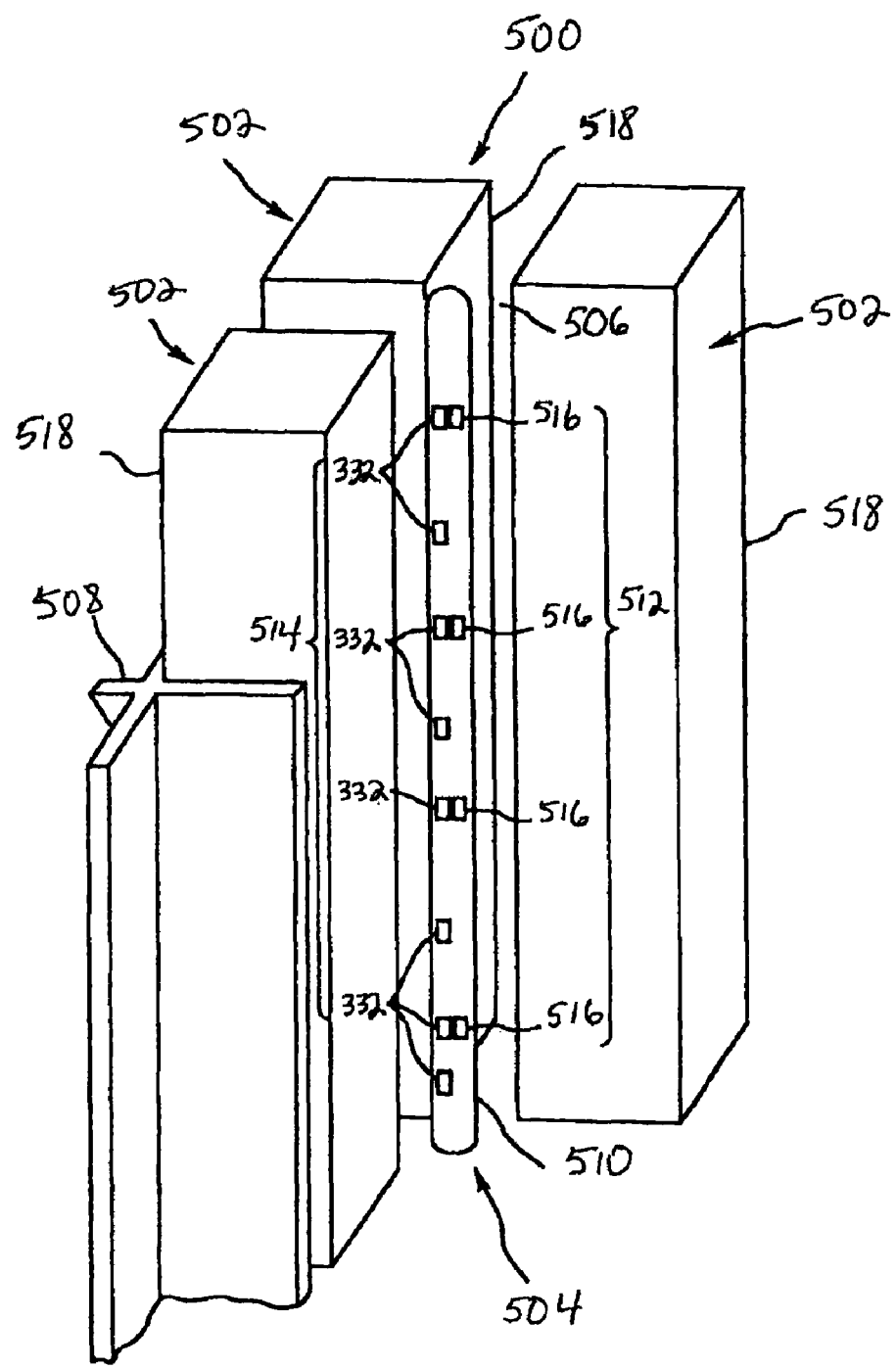
FIG. 5 is a perspective view, partly broken away, showing an arrangement relationship of detectors of an in-core fixed nuclear instrumentation system of a related art power distribution monitoring system.
Figure 6:
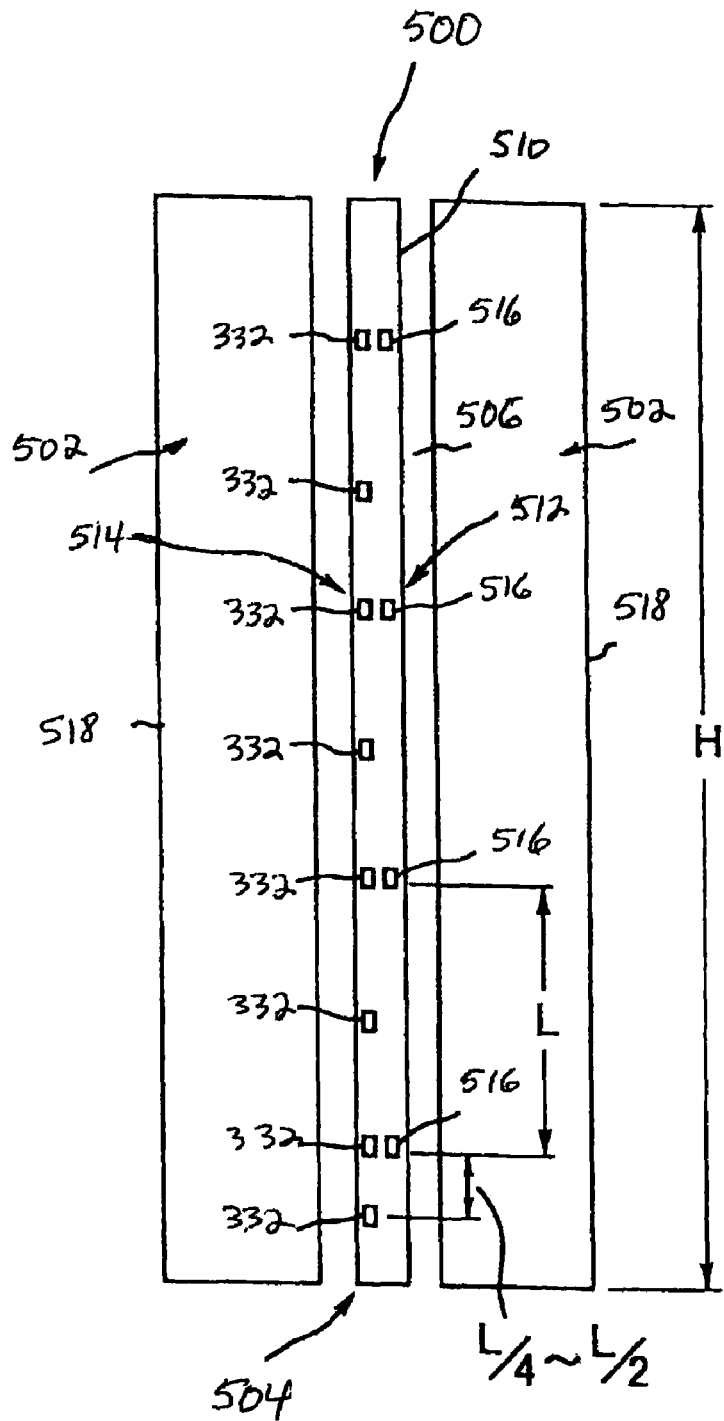
FIG. 6 is a front view, partly broken away, showing the arrangement relationship of the detectors in FIG. 5.
Figure 7:
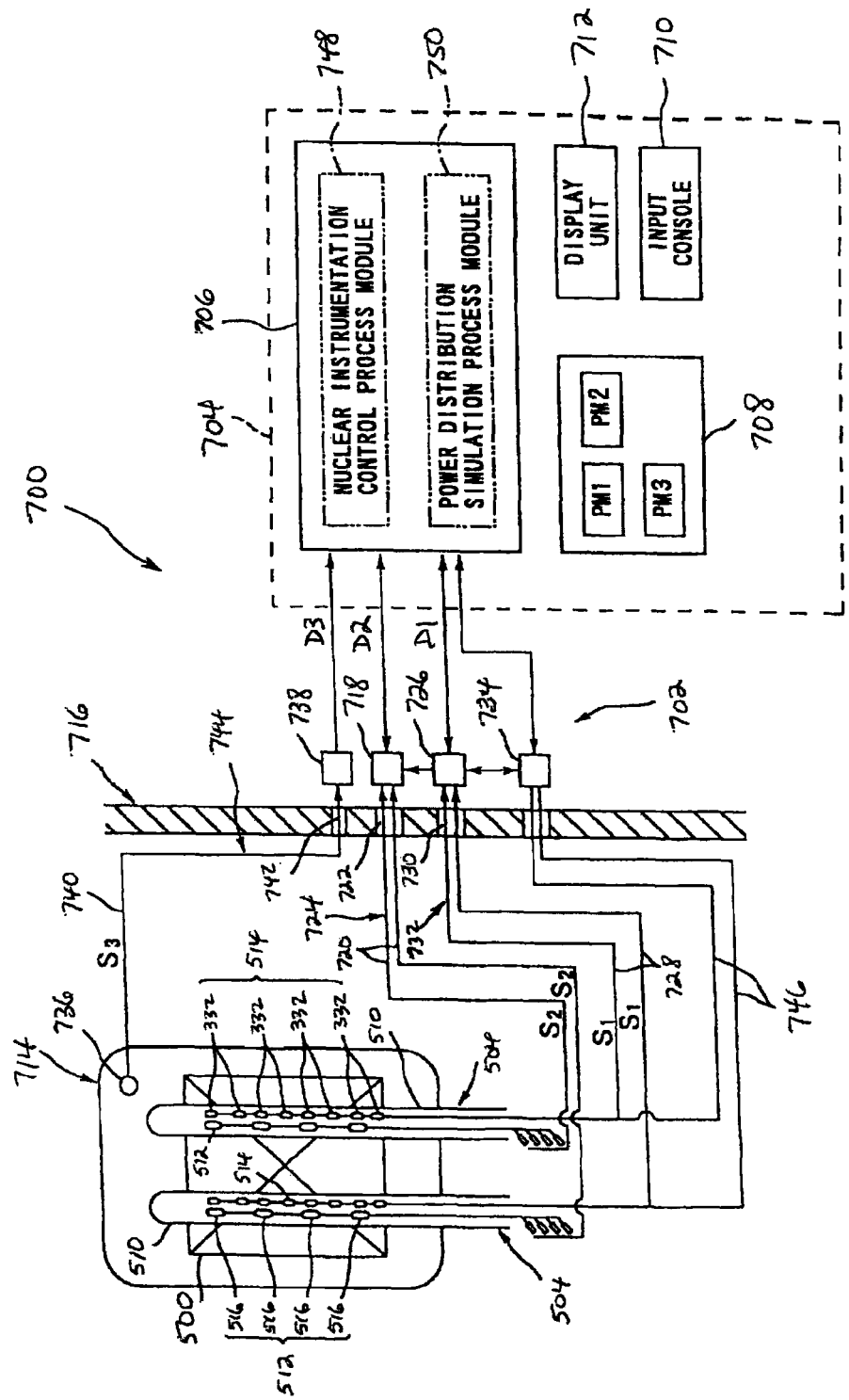
FIG. 7 is a block diagram showing schematically a structure of a reactor power distribution monitoring system of a BWR.
Figure 8:
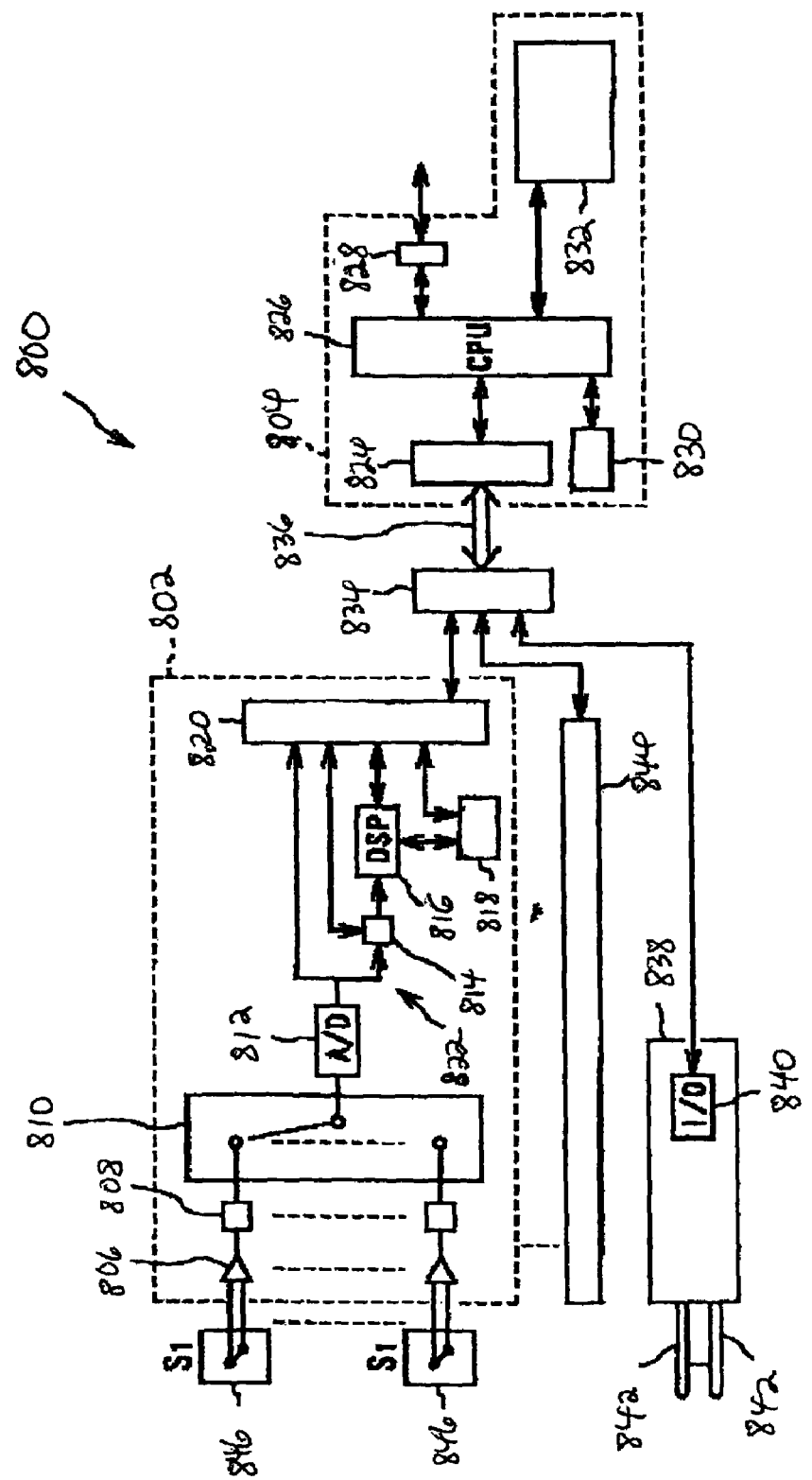
FIG. 8 is a block diagram of a related art GT signal processor.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art.

It will be understood that when a component is referred to as being "on," "connected to," "coupled to," or "fixed to" another component, it may be directly on, connected to, coupled to, or fixed to the other component or intervening components may be present. In contrast, when a component is referred to as being "directly on," "directly connected to," "directly coupled to," or "directly fixed to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

Spatially relative terms, such as "beneath," "below," "lower," "above," "upper," and the like may be used herein for ease of description to describe one component and/or feature relative to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by a PHOSITA to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to the like components throughout.

As discussed above, although the example embodiments are described in terms of BWRs (such as, for example, an Economic Simplified BWR ("ESBWR")), a PHOSITA should recognize that example embodiments also apply to other types of nuclear reactors such as, for example, other water-cooled and/or water-moderated reactors [e.g., pressurized water reactors ("PWR"), pool-type reactors, and heavy water reactors], gas-cooled reactors ("GCR") [e.g., advanced gas-cooled reactors ("AGR")], liquid-metal-cooled reactors, and molten-salt reactors ("MSR").

Figure 9:
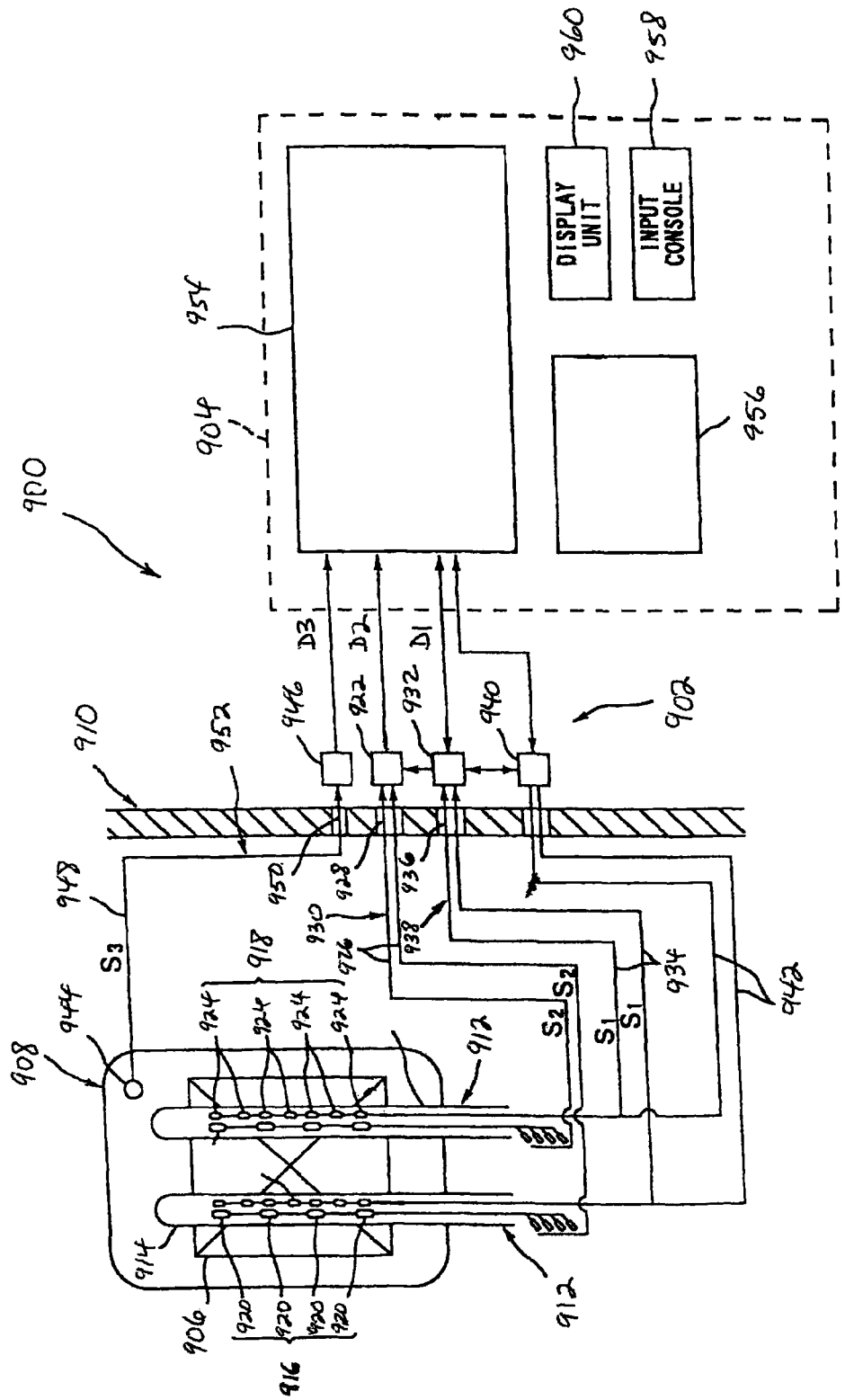
FIG. 9 is a block diagram showing schematically a structure of a reactor power distribution monitoring system according to example embodiments.

FIG. 9 is a block diagram showing schematically a structure of a reactor power distribution monitoring system according to example embodiments.

Reactor power distribution monitoring system 900 may include an in-core fixed nuclear instrumentation system 902. In-core fixed nuclear instrumentation system 902 may have detectors, signal processing units, and process control computer 904 for monitoring an operating mode of the BWR and/or core performance.

Process control computer 904 may include, for example, CPU 954, memory unit 956, input console 958, and/or display unit 960. CPU 954 may be electrically connected to memory unit 956, input console 958, and display unit 960 so as to enable communication between them.

Process control computer 904 may include a function for simulating a core power distribution of the BWR and/or a function for monitoring a core performance of the BWR according to the simulated core power distribution.

As shown in FIG. 9, core 906 may be housed in reactor pressure vessel 908. Reactor pressure vessel 908 may be housed in primary containment 910.

In-core nuclear instrumentation assemblies 912 may include a thin and long nuclear instrumentation tube 914, LPRM detector assembly 916, and GT detector assembly 918.

LPRM detector assembly 916 may function as a fixed neutron detection means. LPRM detector assembly 916 may include a plurality (e.g., four) of LPRM detectors 920. LPRM detectors 920 may be discretely arranged in an axial direction of core 906, at equal intervals. LPRM detectors 920 may substantially cover an effective fuel length of core 906. Each LPRM detector 920 may be configured to measure neutron flux so as to generate a neutron flux signal (LPRM signal) according to the measured neutron flux. And each LPRM detector 920 may be electrically connected to an LPRM signal processing unit 922.

GT detector assembly 918, also housed in nuclear instrumentation tube 914, may function as a fixed gamma ray detection means. GT detector assembly 918 may include a plurality (e.g., seven) of GT detectors 924.

Each LPRM detector 920 may be configured to measure neutron flux so as to generate a neutron flux signal (LPRM signal) according to the measured neutron flux. And each LPRM detector 920 may be electrically connected to LPRM signal processing unit 922 using signal cables 926 through penetration portion 928, forming power range neutron flux measuring system 930. LPRM signal processing unit 922 may include a computer having a CPU, a memory unit, and so on.

LPRM signal processing unit 922 may be configured to receive LPRM signals S2 outputted from LPRM detectors 920. LPRM signal processing unit 922 may be operative to perform, for example, analog-to-digital ("A/D") conversion operations and/or gain processing operations of each LPRM signal S2 transmitted from LPRMs detector 920 so as to obtain digital LPRM data D2. LPRM signal processing unit 922 may be operative to transmit digital LPRM data D2 to process control computer 904.

GT detector assembly 918 may be configured so that the plurality of GT detectors 924 may be discretely arranged in the axial direction of core 906. A gamma ray heating value may be measured by each GT detector 924. The number of GT detectors 924 should be the same as or more than the number of LPRM detectors 920. Each GT detector 924 may be electrically connected to GT signal processing unit 932 using signal cables 934 through penetration portion 936, forming GT power distribution measuring system 938.

GT signal processing unit 932 may be configured to receive GT signals S1 outputted from GT detectors 924, as well as sensitivity $S_0$ and alpha factor $\alpha$ of the respective GT detectors 924. Digital GT data D1 may represent a gamma ray heating value in watts per gram of unit weight (W/g). GT signal processing unit 932 may convert GT signals S1 into digital GT data D1. GT signal processing unit 932 may be operative to transmit digital GT data D1 to process control computer 904.

In-core fixed nuclear instrumentation system 902 may include gamma ray thermometer heater control unit 940. Gamma ray thermometer heater control unit 940 may be electrically connected to each built-in heater using power cables 942.

Core state data measuring device 944 may be provided in reactor pressure vessel 908 and/or primary system piping (not shown). Core state data measuring device 944 may represent multiple measurement systems, including thermocouples, pressure sensors, venturies, pressure sensors, electrical position sensors, and others, many of which may be physically located outside reactor pressure vessel 908 and/or primary containment 910.

Core state data measuring device 944 may provide core state data signals S3. Core state data signals S3 may include, for example, control rod pattern, core coolant flow rate, internal pressure of reactor pressure vessel 908, feed water flow rate, feed water temperature (e.g., core inlet coolant temperature), and so on. Core state data signals S3 may be used as various operating parameters indicative of a reactor operating mode (state) of the BWR.

A first part of core state data measuring device 944, inside reactor pressure vessel 908, may be connected to core state data processing unit 946 using signal cable 948 through penetration portion 950. A second part of core state data measuring device 944, outside reactor pressure vessel 908, may be connected using signal cable 948 to core state data processing unit 946. The first and/or second parts of core state data measuring device 944 may form process data measuring system 952.

Core state data processing unit 946 may be configured to receive core state data signals S3. Core state data processing unit 946 may convert core state data signals S3 into digital core state data D3. Core state data processing unit 946 may be operative to transmit digital core state data D3 to process control computer 904.

CPU 954 may include, for example, a nuclear instrumentation control process module (not shown) and/or a power distribution simulation process module (not shown). The nuclear instrumentation control process module may monitor and/or control in-core fixed nuclear instrumentation system 902.

The power distribution simulation process module may correct the power distribution simulation result of nuclear instrumentation control process module, using digital GT data D1, digital LPRM data D2, and/or digital core state data D3, in order to obtain a core power distribution reflecting the actually measured data in core 906.

Memory unit 956 may include, for example, a nuclear instrumentation control program module (not shown), a power distribution simulation program module (not shown), and/or a power distribution learning (adaptive) program module (not shown). The power distribution simulation program module may include a physics model, such as a three-dimensional thermal-hydraulic simulation code.

The power distribution simulation process module may simulate neutron flux distribution in core 906, may simulate power distribution in core 906, and/or may simulate margins with respect to one or more operational thermal limits (e.g., maximum linear heat generation rate ("MLHGR") and/or minimum critical power ratio ("MCPR")) using the power distribution simulation program module. The power distribution simulation process module may be operative to correct the simulation results in order to obtain a core power distribution reflecting the actually measured core nuclear instrumentation data on the basis of the power distribution learning (adaptive) program module.

As discussed above, the power distribution simulation process module may correct the simulated results (neutron flux distribution and/or power distribution in core 906) stored in memory unit 956—according to inputted digital GT data D1, digital LPRM data D2, and/or digital core state data D3—in order to determine an accurate core power distribution and/or an accurate margin with respect to the one or more operational thermal limits, which reflect the actual core nuclear instrumentation data (digital GT data D1, digital LPRM data D2, and/or digital core state data D3).

In example embodiments, gamma compensation may be performed in GT signal processing unit 932 and/or process control computer 904. For the gamma compensation, core 906 may be assumed to be close to thermal equilibrium, with the temperature in core 906 changing slowly, so that thermal lag may be ignored (thermal lag may have, for example, a time constant between about 15 seconds and 30 seconds).

In example embodiments, gamma compensation values may be calculated that may express the uncompensated and compensated yield fractions of gamma ray energy released in the fission process due to delayed gamma rays. The values may vary depending on the fissionable nuclide(s) and/or other actinide(s) considered. The effect of the delayed gamma rays may be approximated by a weighted sum of decaying exponential functions, each having an associated decay time constant.

In example embodiments, the sources of the delayed gamma rays may have decay time constants greater than $5\times10^{-1}$ seconds and/or less than $5\times10^5$ seconds. In example embodiments, the sources of the delayed gamma rays may be divided into groups, with the groups of delayed gamma sources having decay time constants greater than $5\times10^{-1}$ seconds and/or less than $5\times10^5$ seconds. In example embodiments, the sources of the delayed gamma rays may be divided into groups, with a subset of the groups of delayed gamma sources having decay time constants greater than $5\times10^{-1}$ seconds and/or less than $5\times10^5$ seconds.

In example embodiments, the sources of the delayed gamma rays may have decay time constants greater than 0.4 seconds, 0.5 seconds, 0.6 seconds, 0.7 seconds, 0.8 seconds, 0.9 seconds, 1 second, 1.1 seconds, 1.2 seconds, 1.3 seconds, or 1.4 seconds. In example embodiments, the sources of the delayed gamma rays may have decay time constants less than $1.5\times10^6$ seconds, $1.4\times10^6$ seconds, $1.3\times10^6$ seconds, $1.2\times10^6$ seconds, $1.1\times10^6$ seconds, $1\times10^6$ seconds, $9\times10^5$ seconds, $8\times10^5$ seconds, $7\times10^5$ seconds, $6\times10^5$ seconds, $5\times10^5$ seconds, or $4\times10^5$ seconds.

In example embodiments, the sources of the delayed gamma rays may be divided into groups, with characteristic data for the groups available from one or more sources in, for example, tables and/or equivalent analytical representations. Such sources may include, for example, nuclear industry standards published by the American Nuclear Society. One such standard is the American National Standard "Decay Heat Power in Light Water Reactors", ANSI/ANS-5.1-2005, incorporated by reference in the present application. In Section 3 of the ANS standard, Tables 9-12 provide $\alpha_i$ and $\lambda_i$ parameters (i=1, 2, . . . , 23) for exponential fits to fission functions f(t) and F(t,T). As known to a PHOSITA, fission function f(t) may represent decay heat power per fission following an instantaneous pulse of a significant number of fission events. As also known to a PHOSITA, fission function $F(t,\infty)$ may represent decay heat power from fission products produced at a constant rate over an infinitely long operating period without neutron absorption in the fission products.

The fission functions may be defined by Equations (8), (9), and/or (10) below, with t in seconds, f(t) in MeV/fission-second, $\alpha_i$ in MeV/fission-second, $\lambda_i$ in seconds$^{-1}$, F(t,T) in MeV/fission, F(t, $\infty$) in MeV/fission, and i=1, 2, . . . , 23.

$$f(t)=\Sigma[\alpha_i{}^*\exp(-\lambda_i t)] \qquad (8)$$

$$F(t,T)=\Sigma\{(\alpha_i/\lambda_i)^*\exp(-\lambda_i t)^*[1-\exp(-\lambda_i T)]\} \qquad (9)$$

$$F(t,\infty)=F(t,10^{13}) \qquad (10)$$

Table 9 of the ANS standard provides $\alpha_i$ and $\lambda_i$ parameters for $^{235}$U thermal fission functions f(t) and F(t,$\infty$). Table 10 of the ANS standard provides $\alpha_i$ and $\lambda_i$ parameters for $^{239}$Pu thermal fission functions f(t) and F(t,$\infty$). Table 11 of the ANS standard provides $\alpha_i$ and $\lambda_i$ parameters for $^{238}$U fast fission functions f(t) and F(t,$\infty$). Table 12 of the ANS standard provides $\alpha_i$ and $\lambda_i$ parameters for $^{241}$Pu thermal fission functions f(t) and F(t,$\infty$).

In example embodiments, a decay time constant $\tau_i$ for each group may be defined by Equation (11) below, with $\tau_i$ in seconds, $\lambda_i$ in seconds$^{-1}$, and i=1, 2, . . . , 23.

$$\tau_i=1/\lambda_i \qquad (11)$$

As discussed below, decay time constants $\tau_i$ may be used to determine the groups of interest.

In example embodiments, an amount $MEVPF_i$ of delayed gamma ray energy released by each group may be defined by Equation (12) below, with amount $MEVPF_i$ in MeV/fission, $\alpha_i$ in MeV/fission-second, $\lambda_i$ in seconds$^{-1}$, and i=1, 2, ..., 23.

$$MEVPF_i = \alpha_i/\lambda_i \quad (12)$$

In example embodiments, a total amount TMEVPF of delayed gamma ray energy released may be defined by Equation (13) below, with total amount TMEVPF in MeV/fission, amount $MEVPF_i$ in MeV/fission, and i=1, 2, ..., 23.

$$TMEVPF = \Sigma\ MEVPF_i \quad (13)$$

In example embodiments, an uncompensated yield fraction $UYF_i$ may be defined by Equation (14) below, with uncompensated yield fraction $UYF_i$ having no units, amount $MEVPF_i$ in MeV/fission, total amount TMEVPF in MeV/fission, and i=1, 2, ..., 23.

$$UYF_i = MEVPF_i/TMEVPF \quad (14)$$

In example embodiments, a compensated yield fraction $CYF_i$ may be defined by Equation (15) below, with compensated yield fraction $CYF_i$ having no units, uncompensated yield fraction $UYF_i$ having no units, and i=1, 2, ..., 23. $F_{DG}$, having no units, may be defined by Equation (15) below.

$$CYF_i = UYF_i * F_{DG} \quad (15)$$

In example embodiments, a value may be calculated that may express the fraction of gamma ray energy released in the fission process due to delayed gamma rays. The value may vary depending on the fissionable nuclide(s) and/or other actinide(s) considered.

In example embodiments, three quantities may be used: (a) delayed gamma ray energy released in the fission process ($Q_{DG}$); (b) prompt gamma ray energy released in the fission process ($Q_{PG}$); and (c) capture gamma ray energy released in the fission process ($Q_{CG}$). Although some capture gamma ray energy released in the fission process is delayed, its effect is minor, so capture gamma ray energy released in the fission process ($Q_{CG}$) may be treated as a prompt effect.

The fraction ($F_{DG}$) of gamma ray energy released in the fission process due to delayed gamma rays may be calculated using Equation (16) below.

$$F_{DG} = Q_{DG}/(Q_{DG} + Q_{PG} + Q_{CG}) \quad (16)$$

As known to a PHOSITA, values for $Q_{DG}$ may be found, for example, in the Evaluated Nuclear Data File ("ENDF"). The ENDF may be accessed online, for example, via the website of the National Nuclear Data Center of Brookhaven National Laboratory at http://www.nndc.bnl.gov/. The current online database version of the ENDF is ENDF/B-VII.0 (released Dec. 15, 2006). Clicking on "ENDF", selecting "Basic Retrieval", and using $^{235}$U as the target (entered, for example, as "235u"), brings a user to a page labeled "ENDF Data Selection" that includes fourteen entries, numbered 1-14, with each numbered entry having options such as Info, Summary, MAT, ENDF-6, Interpreted, σ, and/or Plot. Clicking on the Interpreted option for entry number 4 ("U-235(E_REL_FIS)U-235, INFO MT458") brings a user to a page labeled "Interpreted ENDF File", listing components of energy released in $^{235}$U fission. The listed value of $Q_{DG}$ is 5.6000 MeV ($^{235}$U).

As also known to a PHOSITA, values for $Q_{PG}$ may be found, for example, in the ENDF using a similar procedure. On the page labeled "Interpreted ENDF File", the listed value of $Q_{PG}$ is 6.6000 MeV ($^{235}$U).

Additionally, as known to a PHOSITA, values for $Q_{CG}$ may be found, for example, at the website of the Atomic Mass Data Center ("AMDC"). The databases of the AMDC maybe accessed online, for example, via the website of the National Nuclear Data Center at http://www.nndc.bnl.gov/amdc/. Clicking on "Q-value Calculator", using $^{235}$U as the target (entered, for example, as "235u"), a neutron as the projectile (entered, for example, as "n"), and a gamma ray as the ejectile (entered, for example, as "g"), brings a user to a page labeled "Reaction Q-values for $^{235}$U+n" with three columns of data, including the gamma ray Q-value. The listed value of $Q_{CG}$ is 6.54545 MeV ($^{235}$U).

In example embodiments, using the values of $Q_{DG}$=5.6000 MeV, $Q_{PG}$=6.6000 MeV, and $Q_{CG}$=6.54545 MeV in Equation (16) yields $F_{DG}$=0.298739 ($^{235}$U).

In example embodiments, values for $Q_{DG}$, $Q_{PG}$, and/or $Q_{CG}$ may be obtained from other sources. For example, using older data with the values of $Q_{DG}$=6.2600 MeV, $Q_{PG}$=6.9600 MeV, and $Q_{CG}$=7.7500 MeV in Equation (16) yields $F_{DG}$=0.298522 ($^{235}$U).

As discussed above, values for $Q_{DG}$ may be found, for example, in the ENDF. Accessing the ENDF online, clicking on "ENDF", selecting "Advanced Retrieval", and using $^{239}$Pu as the target (entered, for example, as "239pu") and a neutron as the projectile (entered, for example, as "n"), brings a user to a page labeled "ENDF Data Selection" that includes 130 entries, numbered 1-122 and also 1-8, with each numbered entry having options such as Info, Summary, MAT, ENDF-6, Interpreted, σ, and/or Plot. Clicking on the Interpreted option for entry number 4 ("PU-239(E_REL_FIS)PU-240, INFO MT458") brings a user to a page labeled "Interpreted ENDF File", listing components of energy released in $^{239}$Pu fission. The listed value of $Q_{DG}$ is 5.1700 MeV ($^{239}$Pu).

As also known to a PHOSITA, values for $Q_{PG}$ may be found, for example, in the ENDF using a similar procedure. On the page labeled "Interpreted ENDF File", the listed value of $Q_{PG}$ is 6.7410 MeV ($^{239}$Pu).

In example embodiments, accessing the databases of the AMDC online, clicking on "Q-value Calculator", using $^{239}$Pu as the target (entered, for example, as "239pu"), a neutron as the projectile (entered, for example, as "n"), and a gamma ray as the ejectile (entered, for example, as "g"), brings a user to a page labeled "Reaction Q-values for $^{239}$Pu+n" with three columns of data, including the gamma ray Q-value. The listed value of $Q_{CG}$ is 6.5342 MeV ($^{239}$Pu).

In example embodiments, using the values of $Q_{DG}$=5.1700 MeV, $Q_{PG}$=6.7410 MeV, and $Q_{CG}$=6.5432 MeV in Equation (16) yields $F_{DG}$=0.280153 ($^{239}$Pu).

As discussed above, values for $Q_{DG}$ may be found, for example, in the ENDF. Accessing the ENDF online, clicking on "ENDF", selecting "Advanced Retrieval", and using $^{238}$U as the target (entered, for example, as "238u") and a neutron as the projectile (entered, for example, as "n"), brings a user to a page labeled "ENDF Data Selection" that includes 124 entries, numbered 1-116 and also 1-8, with each numbered entry having options such as Info, Summary, MAT, ENDF-6, Interpreted, σ, and/or Plot. Clicking on the Interpreted option for entry number 4 ("U-238(E_REL_FIS)U-239, INFO MT458") brings a user to a page labeled "Interpreted ENDF File", listing components of energy released in $^{238}$U fission. The listed value of $Q_{DG}$ is 8.2500 MeV ($^{238}$U).

As also known to a PHOSITA, values for $Q_{PG}$ may be found, for example, in the ENDF using a similar procedure. On the page labeled "Interpreted ENDF File", the listed value of $Q_{PG}$ is 6.6800 MeV ($^{238}$U).

In example embodiments, accessing the databases of the AMDC online, clicking on "Q-value Calculator", using $^{238}$U as the target (entered, for example, as "238u"), a neutron as the projectile (entered, for example, as "n"), and a gamma ray as the ejectile (entered, for example, as "g"), brings a user to a page labeled "Reaction Q-values for $^{238}$U+n" with three columns of data, including the gamma ray Q-value. The listed value of $Q_{CG}$ is 4.80638 MeV ($^{238}$U).

In example embodiments, using the values of $Q_{DG}$=8.2500 MeV, $Q_{PG}$=6.6800 MeV, and $Q_{CG}$=4.80638 MeV in Equation (16) yields $F_{DG}$=0.418010 ($^{238}$U).

As discussed above, values for $Q_{DG}$ may be found, for example, in the ENDF. Accessing the ENDF online, clicking on "ENDF", selecting "Advanced Retrieval", and using $^{241}$Pu as the target (entered, for example, as "241pu") and a neutron as the projectile (entered, for example, as "n"), brings a user to a page labeled "ENDF Data Selection" that includes 71 entries, numbered 1-65 and also 1-6, with each numbered entry having options such as Info, Summary, MAT, ENDF-6, Interpreted, $\sigma$, and/or Plot. Clicking on the Interpreted option for entry number 4 ("PU-241(E_REL_FIS)PU-242, INFO MT458") brings a user to a page labeled "Interpreted ENDF File", listing components of energy released in $^{241}$Pu fission. The listed value of $Q_{DG}$ is 6.4000 MeV ($^{241}$Pu).

As also known to a PHOSITA, values for $Q_{PG}$ may be found, for example, in the ENDF using a similar procedure. On the page labeled "Interpreted ENDF File", the listed value of $Q_{PG}$ is 7.6400 MeV ($^{241}$Pu).

In example embodiments, accessing the databases of the AMDC online, clicking on "Q-value Calculator", using $^{241}$Pu as the target (entered, for example, as "241pu"), a neutron as the projectile (entered, for example, as "n"), and a gamma ray as the ejectile (entered, for example, as "g"), brings a user to a page labeled "Reaction Q-values for $^{241}$Pu+n" with three columns of data, including the gamma ray Q-value. The listed value of $Q_{CG}$ is 6.30972 MeV ($^{241}$Pu).

In example embodiments, using the values of $Q_{DG}$=6.4000 MeV, $Q_{PG}$=7.6400 MeV, and $Q_{CG}$=6.30972 MeV in Equation (16) yields $F_{DG}$=0.314501 ($^{241}$Pu).

Additionally, as known to a PHOSITA, values for $Q_{DG}$, $Q_{PG}$, and/or $Q_{CG}$ also may be found, for example, in the Japanese Evaluated Nuclear Data Library ("JENDL"), the Joint Evaluated File ("JEF"), and/or the files of the Joint Evaluated Fission and Fusion ("JEFF") project.

FIG. 10 is a table based on Table 9 of the ANS standard ($^{235}$U), including values for group number (no units), $\alpha_i$ (in MeV/fission-second), $\lambda_i$ (in seconds$^{-1}$), $\tau_i$ (in seconds), MEVPF$_i$ (in MeV/fission), UYF$_i$ (no units), and CYF$_i$ (no units). FIG. 10 uses a value for $F_{DG}$ of 0.298739. FIG. 11 also is a table based on Table 9 of the ANS standard ($^{235}$U), including values for group number (no units), $\alpha_i$ (in MeV/fission-second), $\lambda_i$ (in seconds$^{-1}$), $\tau_i$ (in seconds), MEVPF$_i$ (in MeV/fission), UYF$_i$ (no units), and CYF$_i$ (no units). FIG. 11 uses a value for $F_{DG}$ of 0.298522. FIG. 12 is a table based on Table 10 of the ANS standard ($^{239}$Pu), including values for group number (no units), $\alpha_i$ (in MeV/fission-second), $\lambda_i$ (in seconds$^{-1}$), $\tau_i$ (in seconds), MEVPF$_i$ (in MeV/fission), UYF$_i$ (no units), and CYF$_i$ (no units). FIG. 12 uses a value for $F_{DG}$ of 0.280153. FIG. 13 is a table based on Table 11 of the ANS standard ($^{238}$U), including values for group number (no units), $\alpha_i$ (in MeV/fission-second), $\lambda_i$ (in seconds$^{-1}$), $\tau_i$ (in seconds), MEVPF$_i$ (in MeV/fission), UYF$_i$ (no units), and CYF$_i$ (no units). FIG. 13 uses a value for $F_{DG}$ of 0.418010. FIG. 14 is a table based on Table 12 of the ANS standard ($^{241}$Pu), including values for group number (no units), $\alpha_i$ (in MeV/fission-second), $\lambda_i$ (in seconds$^{-1}$), $\tau_i$ (in seconds), MEVPF$_i$ (in MeV/fission), UYF$_i$ (no units), and CYF$_i$ (no units). FIG. 14 uses a value for $F_{DG}$ of 0.314501.

Tables 9-12 of the ANS standard divide the sources of the delayed gamma rays into 23 groups. As a result, FIGS. 10-14 do, as well. However, each of the groups generally has a different value for CYF$_i$. Thus, some groups are more important than others. For example, Group 1 generally has a small value of CYF$_i$. Similarly, Groups 20-23 generally have small values of CYF$_i$. Therefore, in order for the gamma compensation process to be simple, automatic, real-time, and/or with reduced cost, groups with small values of CYF$_i$ may be ignored in the gamma compensation calculations.

The higher numbered groups also have large values of $\tau_i$. Thus, their contribution, typically small, also occurs over an extended time period. Therefore, in order for the gamma compensation process to be simple, automatic, real-time, and/or with reduced cost, groups with large values of $\tau_i$ may be ignored in the gamma compensation calculations.

Applicants note that a typical refueling outage for a nuclear reactor is on the order of about 25 days. Assuming that represents 5 time constants ($\tau_i$), then one time constant ($\tau_i$) is about 5 days or about 4.32×10$^5$ seconds. Therefore, in order for the gamma compensation process to be simple, automatic, real-time, and/or with reduced cost, groups with have values of $\tau_i$ greater than 4.32×10$^5$ seconds may be ignored in the gamma compensation calculations.

In example embodiments, the gamma compensation method may use thirteen groups, specifically Groups 2-14. In addition or in the alternative, the gamma compensation method may use groups of delayed gamma sources having decay time constants, for example, greater than 5×10$^{-1}$ seconds and/or less than 5×10$^5$ seconds. This may account for approximately 94% of the effect of all delayed gamma sources, and much of the remaining 6% would not have an effect until after the refueling outage would be over.

The compensation—using gamma thermometers—may allow calibration of the nuclear instruments to be performed when the associated nuclear reactor is not in steady-state operation, by removing the effect of the delayed gamma sources using Equations (17)-(19) below.

$$\text{Prompt Signal} = \text{Total Signal} - \text{Delayed Signal} \quad (17)$$

The prompt signal, $GT_{prompt}(t)$, represents prompt gamma energy deposition in watts per gram. In Equation (17), t represents time in seconds.

The total signal may be expressed using Equation (18) below.

$$\text{Total Signal} = \{GT(t)/[(1,000*S_0)+(GT(t)*S_0*\alpha)]\} \quad (18)$$

In Equation (18), t represents time in seconds, GT(t) represents a signal from a gamma thermometer in microvolts, $S_0$ represents sensitivity of the gamma thermometer in millivolts/(watt/gram), and $\alpha$ represents an alpha factor of the gamma thermometer in millivolts$^{-1}$.

The delayed signal may be expressed using Equation (19) below.

$$\text{Delayed Signal} = \Sigma\{[\alpha_n * GT_{prompt}(t)]/[1+(t/\tau_n)]\} \quad (19)$$

In Equation (19), n represents a number associated with a delayed gamma group (n=1, 2, ..., 13—recognizing that the 13 groups are Groups 2-14), $\alpha_n$ represents a group fraction of the delayed gamma group, t represents time in seconds, $GT_{prompt}(t)$ represents prompt gamma energy deposition in watts per gram, and $\tau_n$ represents a time constant of the delayed gamma group.

The prompt signal, $GT_{prompt}(t)$, for a given GT detector 924 may be converted to digital GT data D1 and then compared to digital LPRM data D2 for the purpose of calibrating a corresponding LPRM detector 920 and/or providing information to GT signal processing unit 932, GT power distribution measuring system 938, and/or process control computer 904.

In addition or in the alternative, the prompt signals, $GT_{prompt}(t)$, for two or more GT detectors 924 in GT detector assembly 918 may converted to corresponding digital GT data D1 and combined to determine a power distribution (e.g., an axial power distribution) for core 906. Values from such a power distribution may be compared to digital LPRM data D2 for the purpose of calibrating one or more LPRM detectors 920 and/or providing information to GT signal processing unit 932, GT power distribution measuring system 938, and/or process control computer 904.

In example embodiments, initial values for sensitivity $S_0$ and/or alpha factor $\alpha$ may be calculated when the GT is manufactured and calibrated. These initial values may be determined, for example, as a best fit to data using Equation (20) below, where U (in mV) may represent a measured signal from the GT thermocouple and/or W (in W/g) may represent sensor heating applied by a current source used for calibration.

$$U = S_0(0) * W + \alpha * [S_0(0) * W]^2 \qquad (20)$$

While example embodiments have been particularly shown and described, it will be understood by a PHOSITA that various changes in form and details may be made in the example embodiments without departing from the spirit and scope of the present invention as defined by the following claims.

What is claimed is:

1. A method of calibrating a nuclear instrument located in a nuclear reactor core, using a gamma thermometer, comprising:
   measuring, in the nuclear instrument, local neutron flux;
   generating, from the nuclear instrument, a first signal proportional to the measured local neutron flux;
   measuring, using the gamma thermometer located in the nuclear reactor core, local gamma flux;
   generating, from the gamma thermometer, a second signal proportional to the measured local gamma flux;
   compensating the second signal; and
   calibrating a gain of the nuclear instrument based on the compensated second signal;
   wherein compensating the second signal includes:
      filtering groups of delayed gamma sources to a reduced number of specific groups of delayed gamma sources;
      calculating selected yield fractions for the specific groups of delayed gamma sources;
      calculating time constants for the specific groups of delayed gamma sources;
      calculating a third signal that corresponds to delayed local gamma flux based on the selected yield fractions and time constants; and
      calculating the compensated second signal by subtracting the third signal from the second signal; and
   wherein the specific groups of delayed gamma sources have decay time constants greater than $5 \times 10^{-1}$ seconds and less than $5 \times 10^5$ seconds.

2. The method of claim 1, wherein the specific groups of delayed gamma sources are selected from a table or equivalent analytical representation in an American National Standards Institute/American Nuclear Society Standard for Decay Heat Power in Light Water Reactors.

3. The method of claim 2, wherein the table or equivalent analytical representation includes data related to thermal fission of Uranium-235.

4. The method of claim 2, wherein the specific groups of delayed gamma sources include thirteen specific groups of delayed gamma sources.

5. The method of claim 1, wherein the selected yield fractions for the specific groups of delayed gamma sources are calculated in advance and the time constants for the specific groups of delayed gamma sources are calculated in advance.

6. The method of claim 1, wherein compensating the second signal occurs in real-time.

7. The method of claim 1, wherein calibrating the gain of the nuclear instrument based on the compensated second signal occurs automatically.

8. The method of claim 1, wherein the second signal is represented by $$\text{second signal} = \{GT(t)/[(1{,}000 * S_0) + (GT(t) * S_0 * \alpha)]\}$$

wherein the third signal is represented by $$\text{third signal} = \sum_{n=1}^{13} \{[\alpha_n^* GT_{prompt}(t)]/[1 + (t/\tau_n)]\}$$

wherein the compensated second signal is represented by compensated second signal = second signal − third signal wherein n represents a number associated with a delayed gamma group among the specific groups of delayed gamma sources,
wherein t represents time in seconds,
wherein GT(t) represents a signal from a gamma thermometer in microvolts,
wherein $S_0$ represents sensitivity of the gamma thermometer in millivolts/(watt/gram),
wherein $\alpha$ represents an alpha factor of the gamma thermometer in millivolts$^{-1}$,
wherein $\alpha_n$ represents a group fraction of the delayed gamma group,
wherein $GT_{prompt}(t)$ represents prompt gamma energy deposition in watts per gram, and
wherein $\tau_n$ represents a time constant of the delayed gamma group.

9. A method of using a gamma thermometer in a nuclear reactor core, comprising:
   measuring, using the gamma thermometer located in the nuclear reactor core, local gamma flux;
   generating, from the gamma thermometer, a first signal proportional to the measured local gamma flux;
   compensating the first signal; and
   calibrating a gain of a nuclear instrument based on the compensated first signal, the nuclear instrument being located in the nuclear reactor core;
   wherein compensating the first signal includes:
      filtering groups of delayed gamma sources to a reduced number of specific groups of delayed gamma sources;
      calculating selected yield fractions for the specific groups of delayed gamma sources;
      calculating time constants for the specific groups of delayed gamma sources;
      calculating a second signal that corresponds to delayed local gamma flux based on the selected yield fractions and time constants; and
      calculating the compensated first signal by subtracting the second signal from the first signal; and
   wherein the specific groups of delayed gamma sources have decay time constants greater than $5 \times 10^{-1}$ seconds and less than $5 \times 10^5$ seconds.

10. The method of claim 9, wherein the specific groups of delayed gamma sources are selected from a table or equivalent analytical representation in an American National Standards Institute/American Nuclear Society Standard for Decay Heat Power in Light Water Reactors.

11. The method of claim 10, wherein the table or equivalent analytical representation includes data related to thermal fission of Uranium-235.

12. The method of claim 10, wherein the specific groups of delayed gamma sources include thirteen specific groups of delayed gamma sources.

13. The method of claim 9,
wherein the selected yield fractions for the specific groups of delayed gamma sources are calculated in advance and the time constants for the specific groups of delayed gamma sources are calculated in advance.

14. The method of claim 9, wherein compensating the first signal occurs in real-time.

15. The method of claim 9, wherein calibrating the gain of the nuclear instrument based on the compensated first signal occurs automatically.

16. The method of claim 1, wherein the selected yield fractions for the specific groups of delayed gamma sources are calculated in advance, or
wherein the time constants for the specific groups of delayed gamma sources are calculated in advance.

17. The method of claim 9, wherein the selected yield fractions for the specific groups of delayed gamma sources are calculated in advance, or
wherein the time constants for the specific groups of delayed gamma sources are calculated in advance.

18. The method of claim 1, wherein the nuclear instrument is a local power range monitor.

19. The method of claim 9, wherein the nuclear instrument is a local power range monitor.

\* \* \* \* \*